(12) United States Patent
Matsumoto

(10) Patent No.: US 10,531,189 B2
(45) Date of Patent: Jan. 7, 2020

(54) METHOD FOR UTTERANCE DIRECTION DETERMINATION, APPARATUS FOR UTTERANCE DIRECTION DETERMINATION, NON-TRANSITORY COMPUTER-READABLE STORAGE MEDIUM FOR STORING PROGRAM

(71) Applicant: FUJITSU LIMITED, Kawasaki-shi, Kanagawa (JP)

(72) Inventor: Chikako Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/367,417

(22) Filed: Mar. 28, 2019

(65) Prior Publication Data

US 2019/0349674 A1    Nov. 14, 2019

(30) Foreign Application Priority Data

May 11, 2018   (JP) .................................. 2018-091943

(51) Int. Cl.
*H04R 1/40*  (2006.01)
*G01S 11/14*  (2006.01)

(52) U.S. Cl.
CPC .............. *H04R 1/406* (2013.01); *G01S 11/14* (2013.01)

(58) Field of Classification Search
CPC ..... G06F 21/31; G07C 9/00158; G10L 17/10; G10L 13/033; G10L 13/06; G10L 15/02; G10L 15/08; G10L 15/20; G10L 19/093; G10L 2021/02166; G10L 21/02; G10L 21/0208; G10L 25/06; G10L 25/18; G10L 25/24; G10L 15/063; G10L 2015/085
(Continued)

(56) References Cited

U.S. PATENT DOCUMENTS 9,691,372 B2 *  6/2017  Matsumoto ......... G10L 21/0216
2006/0125854 A1 *  6/2006  Jackson Pulver .... B41J 2/04505
        347/9
(Continued)

FOREIGN PATENT DOCUMENTS

JP   10-243494     9/1998
JP   2003-061184   2/2003
(Continued)

*Primary Examiner* — Lun-See Lao
(74) *Attorney, Agent, or Firm* — Fujitsu Patent Center

(57) ABSTRACT

A method for determining an utterance direction includes: executing a first calculation process that includes determining an utterance direction region based on a phase difference of each given frequency between a first frequency signal and a second frequency signal inputted to a first and second voice input section respectively, and performing a process of calculating a first phase difference deviation degree indicating the degree by which the phase difference of each given frequency is deviated from the utterance direction region; executing a second calculation process for calculating a second phase difference deviation degree from the first phase difference deviation degree of the plurality of frames; and executing an utterance direction determination process for determining that a user is uttering a voice to the first voice input section and the second voice input section when the second phase difference deviation degree is equal to or smaller than a first threshold value.

15 Claims, 23 Drawing Sheets

(58) Field of Classification Search
USPC .......... 381/92, 1, 56–58; 704/275, 205, 233, 704/235
See application file for complete search history.

(56) References Cited

U.S. PATENT DOCUMENTS

| | | | |
|---|---|---|---|
| 2010/0111325 A1* | 5/2010 | Matsuo | G01C 21/3664 381/92 |
| 2011/0082690 A1 | 4/2011 | Togami et al. | |
| 2011/0158426 A1* | 6/2011 | Matsuo | H04R 3/005 381/92 |
| 2013/0166286 A1* | 6/2013 | Matsumoto | G10L 21/02 704/205 |
| 2014/0200886 A1* | 7/2014 | Matsumoto | G10L 21/0208 704/226 |
| 2015/0331490 A1* | 11/2015 | Yamada | G06F 3/017 345/156 |
| 2016/0284336 A1 | 9/2016 | Matsumoto | |

FOREIGN PATENT DOCUMENTS

| | | |
|---|---|---|
| JP | 2009-210956 | 9/2009 |
| JP | 2011-080868 | 4/2011 |
| JP | 2011-186384 | 9/2011 |
| JP | 2014-153663 | 8/2014 |
| JP | 2016-181789 | 10/2016 |

\* cited by examiner

FIG. 20

| ORIENTATION OF USER'S FACE \ USER'S POSITION | IN FRONT OF MICS | TO RIGHT OF MICS |
|---|---|---|
| FACE TURNED TO MICS | 95% | 93% |
| FACE NOT TURNED TO MICS | 92% | 91% |

METHOD FOR UTTERANCE DIRECTION DETERMINATION, APPARATUS FOR UTTERANCE DIRECTION DETERMINATION, NON-TRANSITORY COMPUTER-READABLE STORAGE MEDIUM FOR STORING PROGRAM

CROSS-REFERENCE TO RELATED APPLICATION

This application is based upon and claims the benefit of priority of the prior Japanese Patent Application No. 2018-91943, filed on May 11, 2018, the entire contents of which are incorporated herein by reference.

FIELD

The embodiments discussed herein are related to a method for utterance direction determination, an apparatus for utterance direction determination, and a non-transitory computer-readable storage medium for storing a program.

BACKGROUND

Due to widespread use of smart speakers and other voice-activated devices, there are increased opportunities to use voice in order, for example, to launch an application or search for information without performing a particular procedure, such as pressing a button, before utterance. A voice is usually uttered to a smart speaker or other voice-activated device without pressing, for example, a button to indicate the start of voice input. Therefore, when an unintended voice is uttered, the voice-activated device may perform an operation not intended by a user.

There is a technology for determining whether or not the user is uttering a voice to a microphone (hereinafter referred to as the mic) in order to suppress the voice-activated device from performing an operation not intended by the user. This technology uses, for example, image data acquired by capturing an image of the user. In this instance, however, a camera needs to be installed to acquire such image data. This results in an increased cost and in a complex system. In addition, many users are reluctant to be photographed for such image data acquisition.

Examples of the related art include Japanese Laid-open Patent Publication No. 10-243494, Japanese Laid-open Patent Publication No. 2016-181789, and Japanese Patent No. 5387459.

SUMMARY

According to an aspect of the embodiments, a method for determining an utterance direction includes: executing a first calculation process that includes determining, for each frame, an utterance direction region in accordance with a phase difference of each given frequency between a first frequency signal and a second frequency signal, the first frequency signal corresponding to a first voice signal inputted to a first voice input section, the second frequency signal corresponding to a second voice signal inputted to a second voice input section, and performing, for a plurality of frames, a process of calculating a first phase difference deviation degree, the first phase difference deviation degree indicating the degree by which the phase difference of each given frequency is deviated from the utterance direction region; executing a second calculation process that includes calculating a second phase difference deviation degree from the first phase difference deviation degree of the plurality of frames, the second phase difference deviation degree being a statistical value of the plurality of frames; and executing an utterance direction determination process that includes, when the second phase difference deviation degree is equal to or smaller than a first threshold value, determining that a user is uttering a voice to the first voice input section and the second voice input section.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 20 is a table illustrating result of verification of the fourth embodiment;

DESCRIPTION OF EMBODIMENTS

There is a technology that does not use image data, but determines based on voice data whether or not a user is uttering a voice to mics. The technology analyzes the frequency spectrum of an output from a pair of mics, and determines based on the power ratio of voice signals in a 10 to 20 kHz band whether or not the user is uttering a voice to the mics.

The technology assumes that the user is at an intermediate position between the two mics. Therefore, if the user moves, the technology is unable to properly determine the orientation of the user. The technology is able to estimate the position of the user in accordance with the amount of voice delay. However, positions and angles within a certain range need to be covered in order to calculate a correction coefficient for user movement. As a result, a great load is imposed.

An aspect of the embodiments discussed herein makes it possible to determine based on a voice signal acquired by mics whether or not a user is uttering a voice to the mics even in a situation where the positional relationship between the user and the mics changes.

First Embodiment

An example of a first embodiment will now be described in detail with reference to the accompanying drawings.

Figure 1:
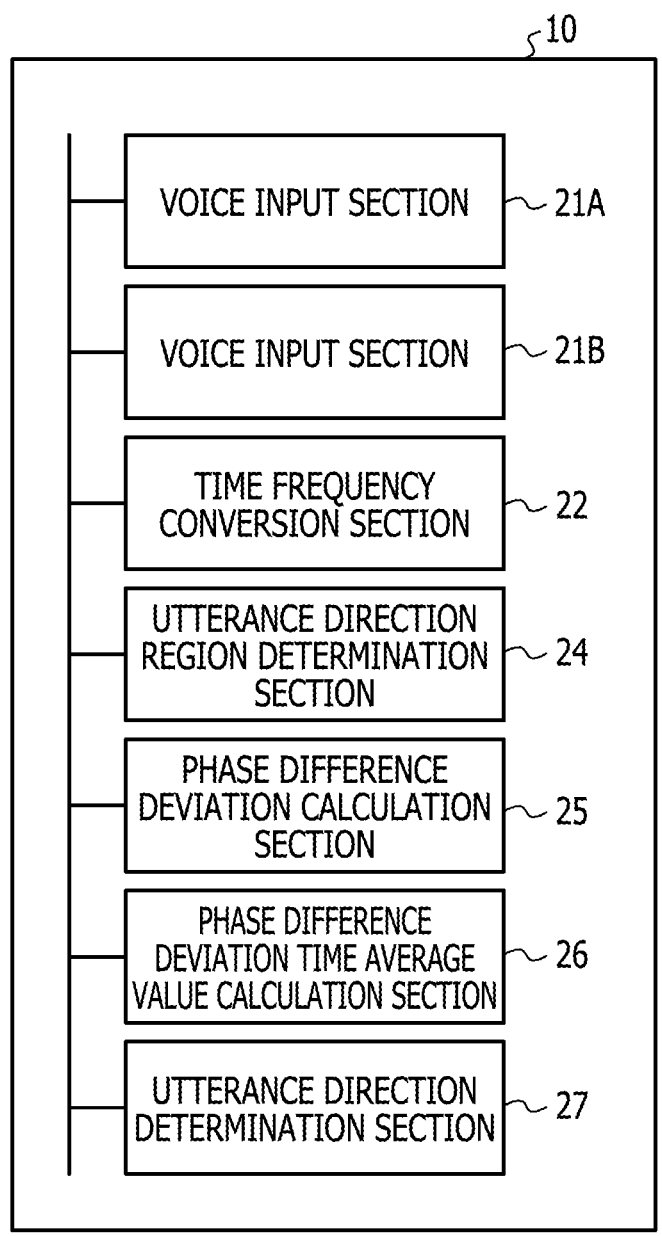
FIG. 1 is a block diagram illustrating exemplary essential functions of an utterance direction determination device according to first to fourth embodiments.

FIG. 1 is a block diagram illustrating exemplary essential functions of an utterance direction determination device according to first to fourth embodiments. An utterance direction determination device 10 depicted in FIG. 1 includes voice input sections 21A and 21B, a time frequency conversion section 22, an utterance direction region determination section 24, a phase difference deviation calculation section 25, a phase difference deviation time average value calculation section 26, and an utterance direction determination section 27. The voice input sections 21A and 21B detect a voice and convert the detected voice to a voice signal. The following description assumes that two voice input sections are included. However, the present embodiment is not limited to such a configuration, and may be configured so that three or more voice input sections are included.

The time frequency conversion section 22 performs time frequency conversion on a voice signal. The time frequency conversion section 22 uses, for example, a fast Fourier transformation (FFT) to convert voice signals INTA and INTB whose amplitudes vary with time to frequency signals INFA and INFB whose amplitudes vary with frequency. The utterance direction region determination section 24 determines an utterance direction region. The utterance direction region includes a direction that is estimated to be a direction in which a user is uttering a voice.

Figure 2:
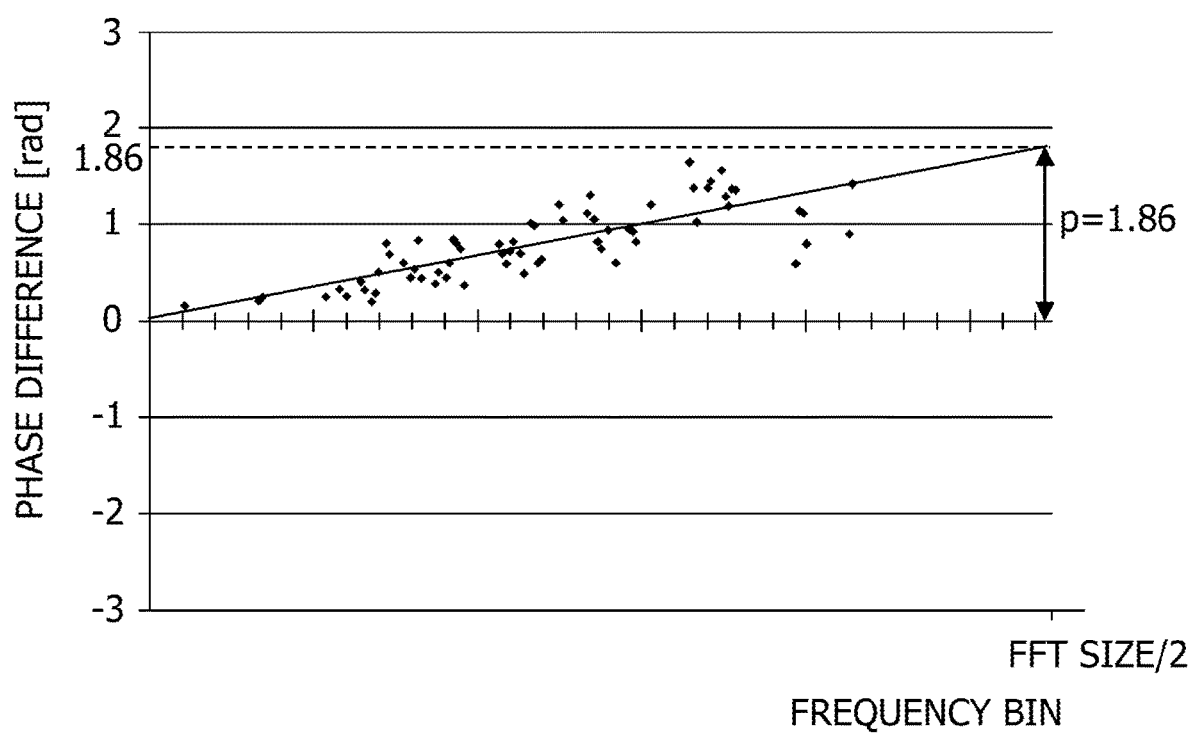
FIG. 2 is a conceptual diagram illustrating relationship between phase difference and frequency for explanation of utterance direction region determination.

The utterance direction region determination section 24 first estimates an utterance direction. FIG. 2 illustrates relationship between phase difference and frequency of each frequency bin of frequency signals. The vertical axis of FIG. 2 represents phase difference [rad], and the horizontal axis represents a frequency bin number. The maximum value of the frequency bin number is FFT size/2. The FFT size is the number of points per frame in a situation where the FFT is used for time frequency conversion.

As depicted in FIG. 2, the utterance direction is expressed, for example, by a straight line between the point (0, 0) and the point (FFT size/2, p). The point (0, 0) is a point at which the frequency bin number is 0 and the phase difference is 0 [rad]. The point (FFT size/2, p) is a point at which the frequency bin number is FFT size/2 and the phase difference is p [rad]. The phase difference p [rad] is the value of an utterance direction phase difference at the frequency bin number FFT size/2.

The utterance direction phase difference p [rad] is calculated, for example, by calculating the phase difference× sampling frequency/(2× frequency bin) of each frequency bin, adding up the results of calculations, and dividing the result of addition by FFT size/2. In the example of FIG. 2, the sampling frequency is 22,050 [Hz] so that the utterance direction phase difference p is 1.86 [rad].

Figure 3A:
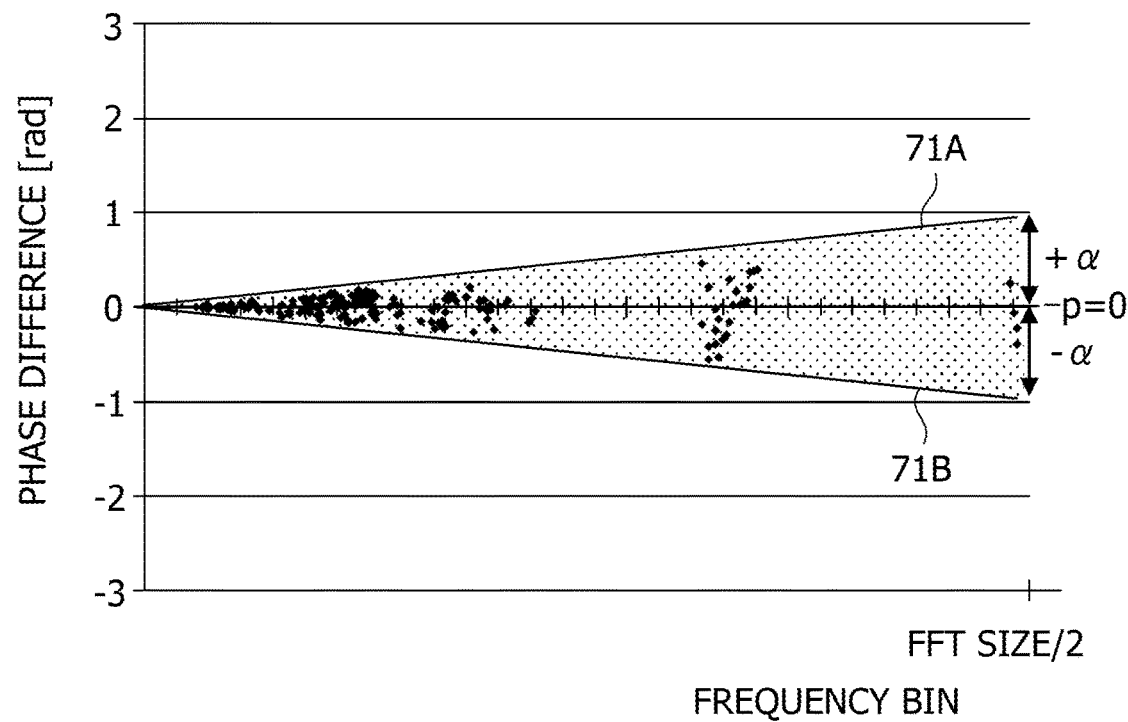
FIG. 3A is a conceptual diagram illustrating relationship between phase difference and frequency for explanation of utterance direction region determination.

As depicted in FIG. 3A, the utterance direction region determination section 24 determines a region enclosed by a straight line 71A and a straight line 71B as the utterance direction region. The straight line 71A is a straight line between the point (0, 0) and the point (FFT size/2, p+α). The point (0, 0) is a point at which the frequency bin number is 0 and the phase difference is 0 [rad]. The point (FFT size/2, p+α) is a point at which the frequency bin number is FFT size/2 and the phase difference is p+α. The straight line 71B is a straight line between the point (0, 0) and the point (FFT size/2, p−α). The point (0, 0) is a point at which the frequency bin number is 0 and the phase difference is 0 [rad]. The point (FFT size/2, p−α) is a point at which the frequency bin number is FFT size/2 and the phase difference is p−α. For example, a may be 1.0 [rad].

Figure 3B:
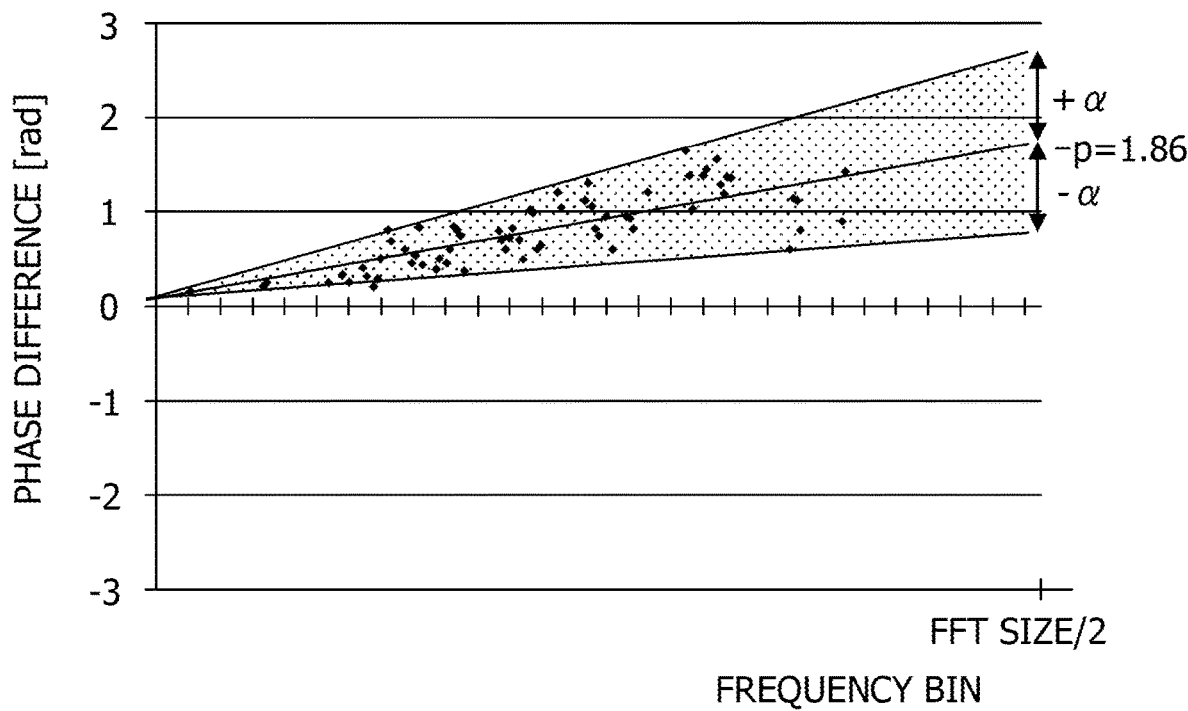
FIG. 3B is a conceptual diagram illustrating relationship between phase difference and frequency for explanation of utterance direction region determination.

FIG. 3A depicts an example in which the utterance direction phase difference is 0 [rad], and FIG. 3B depicts an example in which the utterance direction phase difference is 1.86 [rad]. The utterance direction and the utterance direction region may be simultaneously determined, for example, by preparing a plurality of pre-divided phase difference regions, calculating, by using a phase difference, the probability with which a sound source exists in each region, and selecting a region accordingly.

The phase difference deviation calculation section 25 is an example of a first phase difference deviation calculation section, and calculates a phase difference deviation degree of each frame. The phase difference deviation degree is an example of a first phase difference deviation degree. Each frame may be, for example, approximately 10 [ms] in length. The phase difference deviation degree $D_{fn}$ of each frame is calculated, for example, by Equation (1) below. If no frame number is specified below, the phase difference deviation degree is represented by D.

$$D_{fn} = \frac{\sum_{fr=0}^{FR-1} \Delta d_{fr}}{FR} \quad (1)$$

Figure 4A:
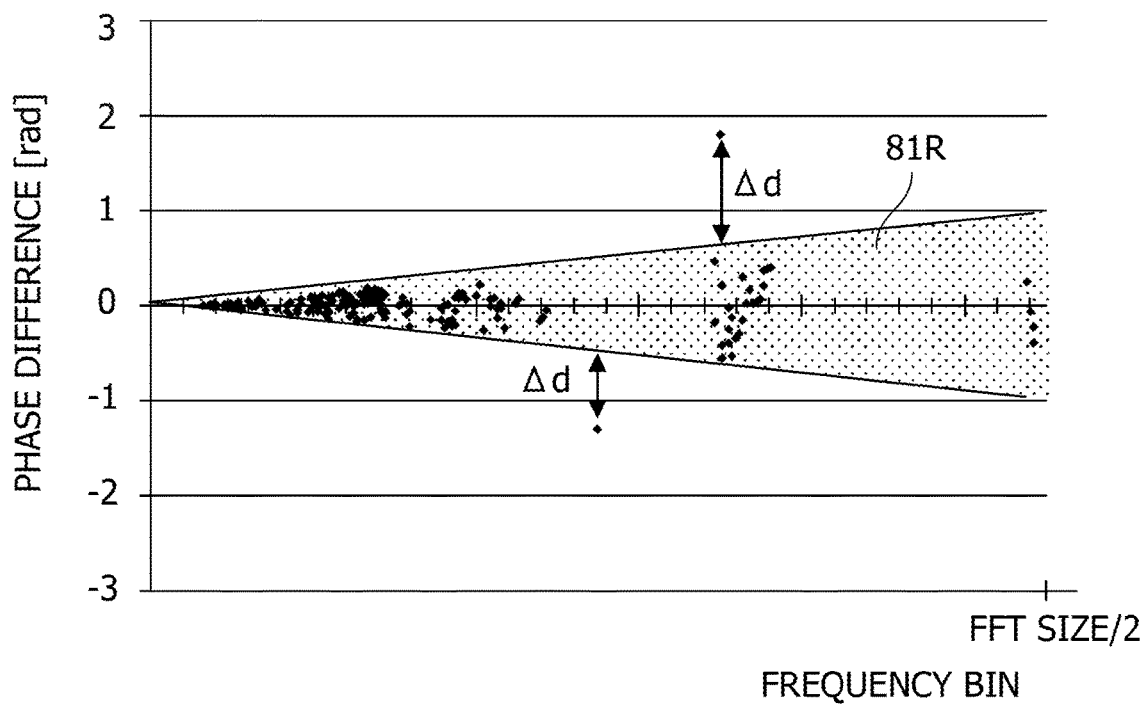
FIG. 4A is a conceptual diagram illustrating relationship between phase difference and frequency for explanation of phase difference deviation degree calculation.

FR is the maximum frequency bin number. When time frequency conversion is performed by the FFT, FR is FFT size/2. As depicted in FIG. 4A, an individual phase difference deviation degree $\Delta d_{fr}$ is the degree by which the phase difference between the frequency signals INFA and INFB is deviated from an utterance direction region 81R when the frequency bin number is fr, for example, the distance in the vertical axis direction between an end of the utterance direction region 81R and the phase difference. FIG. 4A depicts an example in which p=0 and α=1, and the utterance direction region 81R is a region enclosed by the point (0, 0), the point (FFT size/2, 1), and the point (FFT size/2, −1).

If no frequency bin number is specified below, the individual phase difference deviation degree is represented by Δd. If the phase difference between the frequency signals INFA and INFB exists in the utterance direction region 81R, Δd is 0.

The phase difference deviation calculation section 25 calculates the individual phase difference deviation degree $\Delta d_{fr}$ for each frequency bin fr, and calculates the phase difference deviation degree $D_{fn}$ of each frame, which is the average of values indicative of an individual phase difference deviation degree Δd in a frame. fn represents a frame number. The phase difference deviation degree $D_{fn}$ may be a value that is obtained merely by adding up the values indicative of the individual phase difference deviation degree Δd in a frame.

The phase difference deviation time average value calculation section 26 is an example of a second phase difference deviation calculation section, and calculates a phase difference deviation degree time average value $AD_{fn}$. The phase difference deviation degree time average value $AD_{fn}$ is the average of values indicative of a phase difference deviation degree D of each of a given number of frames. The phase difference deviation degree time average value $AD_{fn}$ is an example of a second phase difference deviation degree and calculated by Equation (2) below. fc is a number indicative of the given number of frames, and may be, for example, 10. $AD_{fn}$ is the average of values indicative of the phase difference deviation degree D of previous fc frames beginning with the frame number fn. If no frame number is specified below, the phase difference deviation degree time average value is represented by AD.

$$AD_{fn} = \frac{\sum_{i=0}^{fc-1} D_{fn-1}}{fc} \quad (2)$$

Figure 4B:
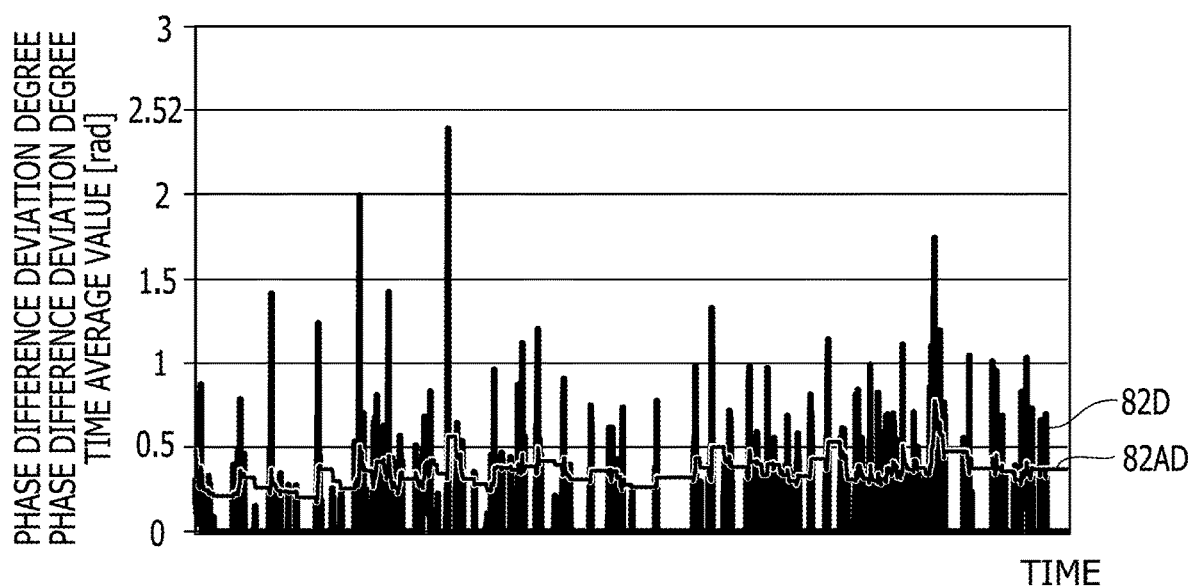
FIG. 4B is a conceptual diagram illustrating relationship between phase difference deviation degree and time and relationship between phase difference deviation degree time average value and time.

FIG. 4B illustrates the relationship between phase difference deviation degree D and time and the relationship between phase difference deviation degree time average value AD and time. The vertical axis of FIG. 4B represents a phase difference deviation degree D or a phase difference deviation degree time average value AD, and the horizontal axis represents time, for example, the frame number fn. In FIG. 4B, the phase difference deviation degree D is represented by a bar 82D, and the phase difference deviation degree time average value AD is represented by a line 82AD.

Figure 5A:
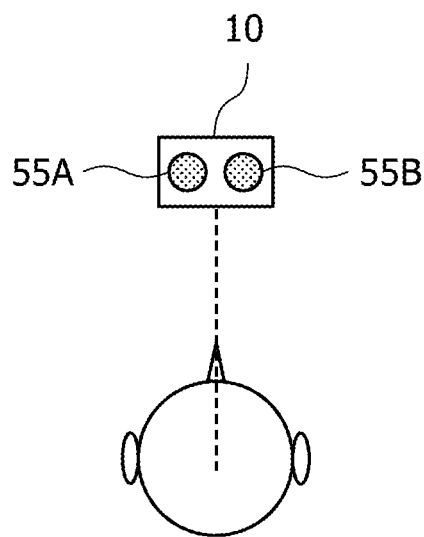
FIG. 5A is a conceptual diagram illustrating orientation of a user's face with respect to mics.
Figure 5B:
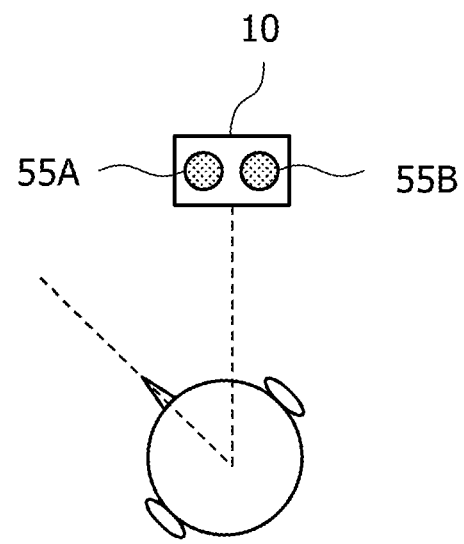
FIG. 5B is a conceptual diagram illustrating orientation of a user's face with respect to mics.
Figure 5C:
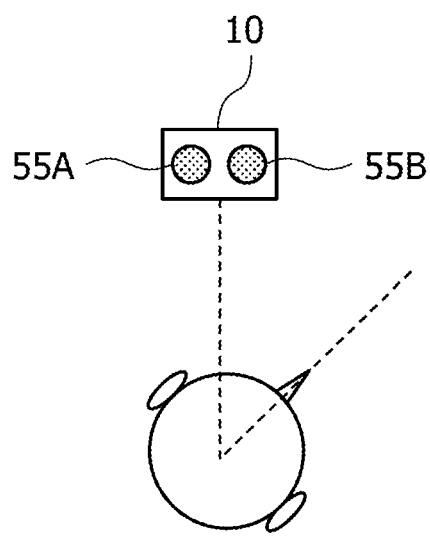
FIG. 5C is a conceptual diagram illustrating orientation of a user's face with respect to mics.

The utterance direction determination section 27 determines whether or not the user is uttering a voice to the voice input sections 21A and 21B. For example, the utterance direction determination section 27 determines whether the face of the user uttering a voice, for example, the mouth of the user, is turned to microphones (hereinafter referred to as the mics) 55A and 55B. The mics 55A and 55B are examples of the voice input sections 21A and 21B. When the mics 55A and 55B are not to be distinguished from each other, they are hereinafter referred to as the mics 55. FIG. 5A illustrates an example in which the face of the user is turned to the mics 55. FIGS. 5B and 5C illustrate examples in which the face of the user is not turned to the mics 55.

As illustrated in FIG. 5A, the mics 55A and 55B are disposed at a given distance from the utterance direction determination device 10. When it is said that the face of the user is turned to the mics 55, for example, it represents a case where the face of the user is turned to a region having a given range centered with respect to the intermediate position between the mics 55A and 55B.

If the phase difference deviation degree time average value AD is not greater than a given threshold value, the utterance direction determination section 27 determines that the user is uttering a voice to the mics 55. The given threshold value is an example of a first threshold value, and may be, for example, 0.6 [rad]. However, the present embodiment is not limited to such a given threshold value.

Figure 6A:
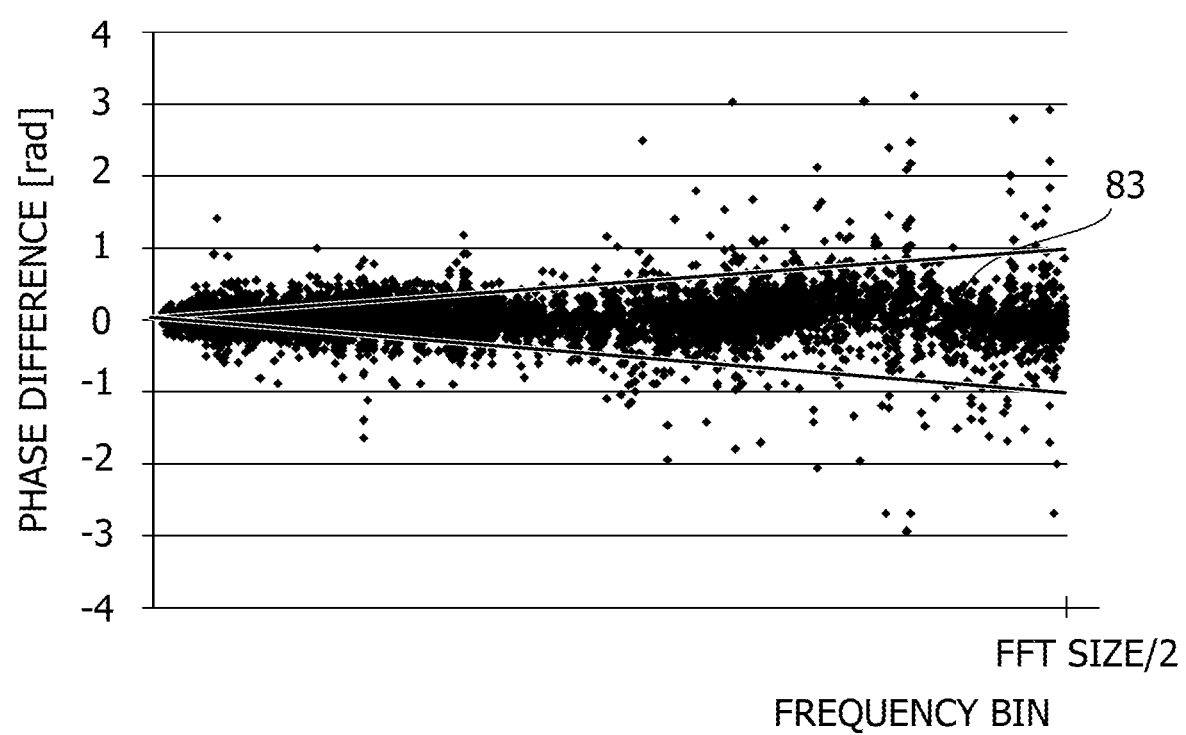
FIG. 6A is a conceptual diagram illustrating relationship between phase difference and frequency.

FIG. 6A illustrates the relationship between phase difference and frequency of each frequency bin of the frequency signals INFA and INFB in a situation where the user is uttering a voice to the mics 55 as illustrated in FIG. 5A. In FIG. 6A, however, the phase difference between the frequency signals INFA and INFB of a plurality of frames is superimposed in order to conspicuously indicate its characteristics. An utterance direction region 83 depicted in FIGS. 6A, 6B, and 6C is similar to the utterance direction region 81R depicted in FIG. 4A.

Figure 6B:
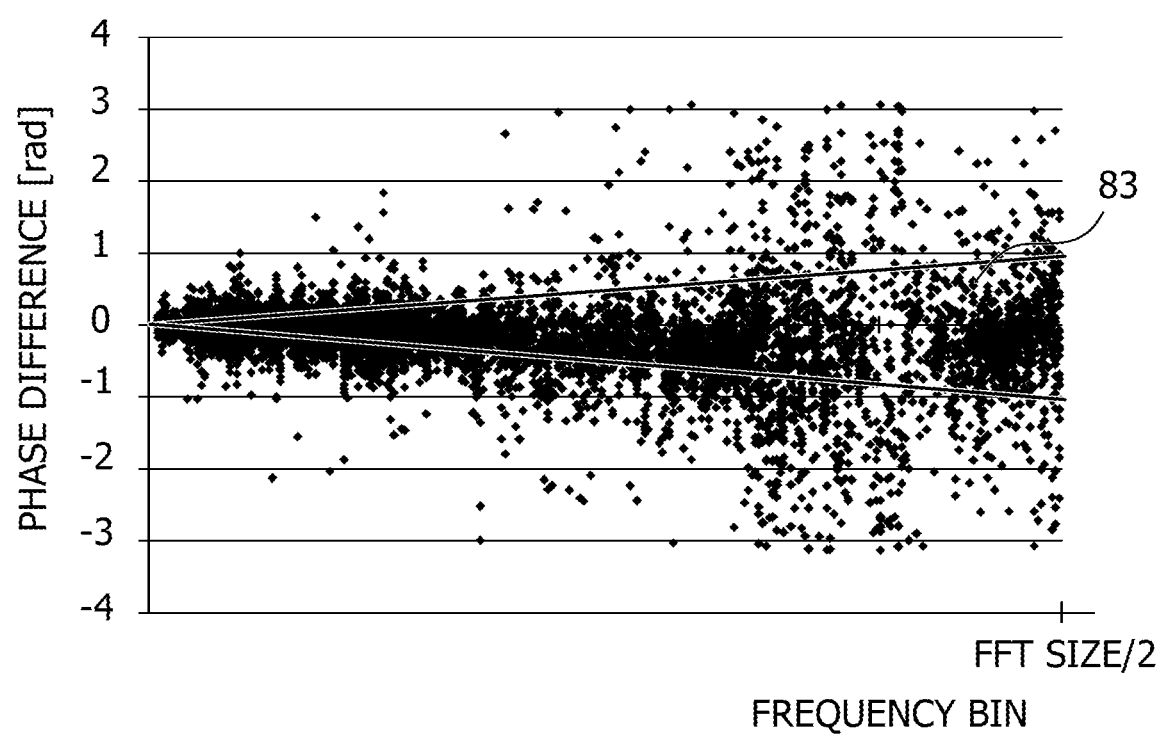
FIG. 6B is a conceptual diagram illustrating relationship between phase difference and frequency.

FIG. 6B illustrates the relationship between phase difference and frequency in a situation where the user is not facing the mics 55, but is uttering a voice to the left of the mics 55 as illustrated in FIG. 5B. FIG. 6C illustrates the relationship between phase difference and frequency of each frequency bin of the frequency signals INFA and INFB in a situation where the user is not facing the mics 55, but is uttering a voice to the right of the mics 55 as illustrated in FIG. 5C.

Figure 6C:
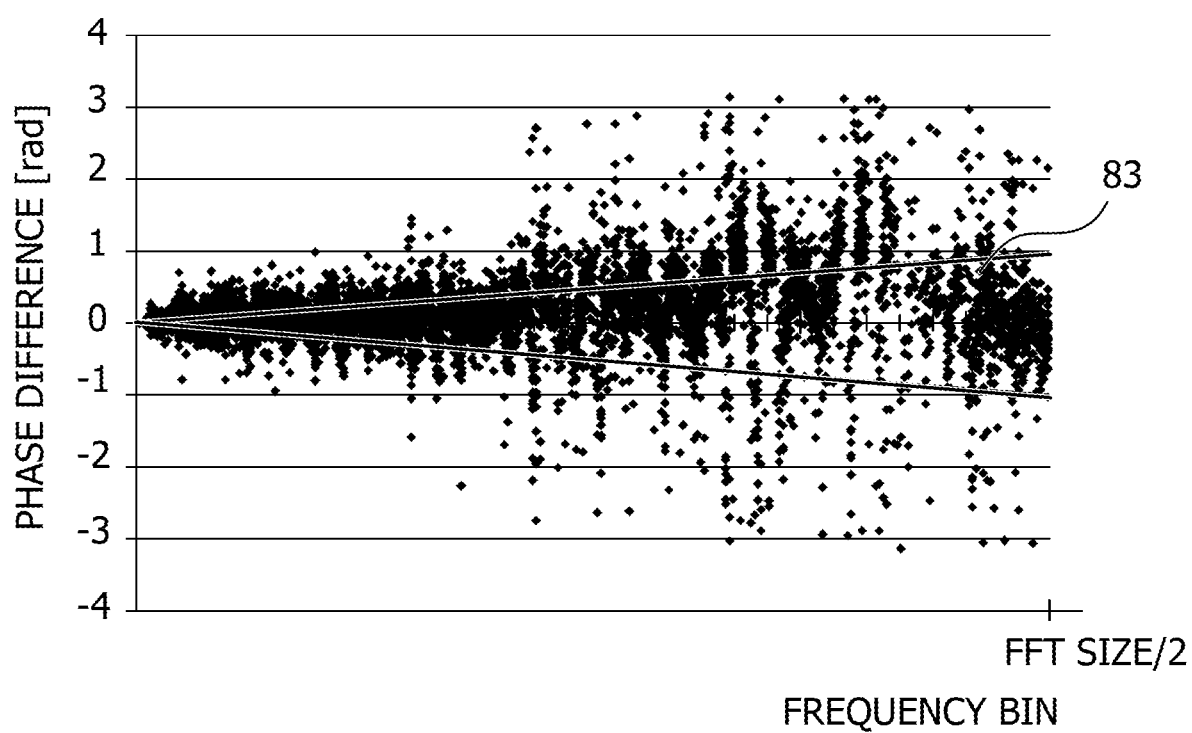
FIG. 6C is a conceptual diagram illustrating relationship between phase difference and frequency.

In contrast to FIG. 6A, FIGS. 6B and 6C depict many phase differences between the frequency signals INFA and INFB that are deviated from the utterance direction region 83. For example, when the user is uttering a voice without facing the mics 55 as illustrated in FIGS. 5B and 5C, the phase difference deviation degree time average value AD is greater than when the user is uttering a voice to the mics 55 as illustrated in FIG. 5A.

Figure 7:
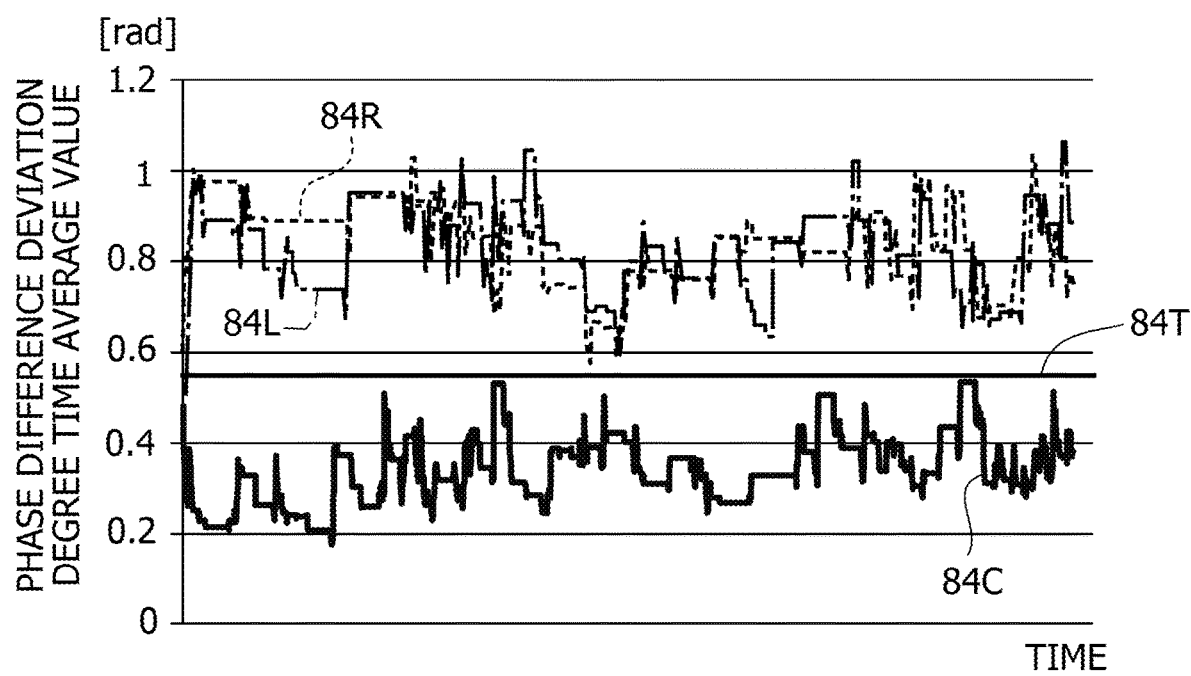
FIG. 7 is a conceptual diagram illustrating relationship between phase difference deviation degree time average value and threshold value.

FIG. 7 illustrates phase difference deviation degree time average values 84C, 84L, and 84R, which respectively correlate with FIGS. 6A, 6B, and 6C. As illustrated in FIG. 7, the phase difference deviation degree time average value 84C, which correlates with FIG. 6A, differs in overall magnitude from the phase difference deviation degree time average values 84L and 84R, which correlate with FIGS. 6B and 6C. The orientation of the user's face may be determined, for example, by checking whether or not the phase difference deviation degree time average value is not greater than a given threshold value 84T.

In a situation where the position of the user relative to the mics remains unchanged, the amount of reflected sound is smaller than the amount of direct sound when the user utters a voice to the mics, and the amount of reflected sound is greater than the amount of direct sound when the user utters a voice without facing the mics. For example, when the user utters a voice without facing the mics, the amount of reflected sound detected by the mics increases. This increases the number of occurrences of a relatively great individual phase difference deviation degree so that the phase difference deviation degree time average value increases. Consequently, when the phase difference deviation degree time average value is not greater than the given threshold value, it may be determined that the user is uttering a voice to the mics.

Figure 8A:
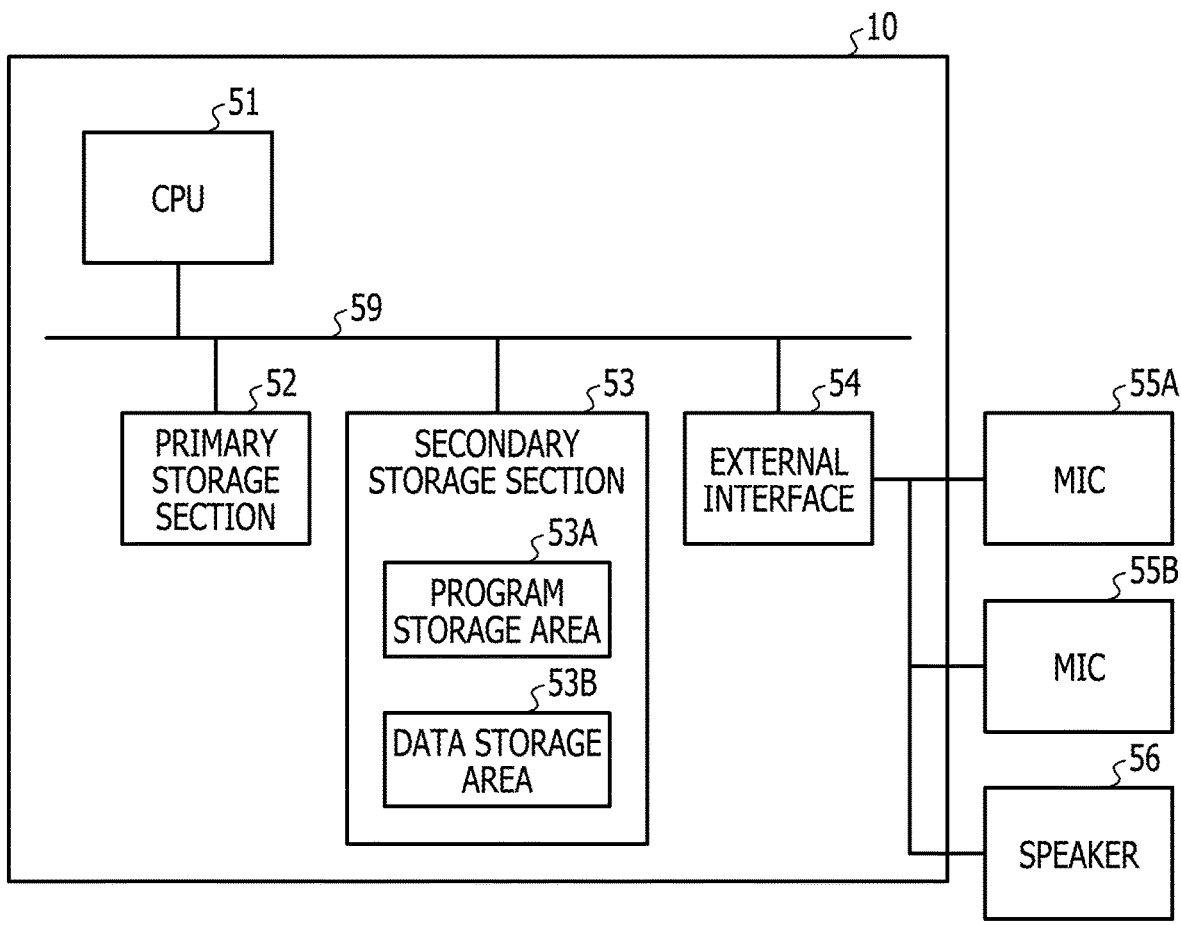
FIG. 8A is a block diagram illustrating an exemplary hardware configuration of an utterance direction determination device according to the first to fourth embodiments.

As illustrated in FIG. 8A, the utterance direction determination device 10 includes, for example, a central processing unit (CPU) 51, a primary storage section 52, a secondary storage section 53, and an external interface 54. The CPU 51 is an example of a processor that is hardware. The CPU 51, the primary storage section 52, the secondary storage section 53, and the external interface 54 are intercoupled through a bus 59.

The primary storage section 52 is, for example, a random access memory (RAM) or other volatile memory. The secondary storage section 53 is, for example, a hard disk drive (HDD), a solid state drive (SSD), or other nonvolatile memory.

The secondary storage section 53 includes a program storage area 53A and a data storage area 53B. The program storage area 53A stores a program, for example, an utterance direction determination program. The data storage area 53B stores, for example, voice signals and intermediate data that is generated during the execution of the utterance direction determination program.

The CPU 51 reads the utterance direction determination program from the program storage area 53A and loads the utterance direction determination program into the primary storage section 52. By executing the utterance direction determination program, the CPU 51 operates as the time frequency conversion section 22, the utterance direction region determination section 24, the phase difference deviation calculation section 25, the phase difference deviation time average value calculation section 26, and the utterance direction determination section 27 depicted in FIG. 1.

A program such as the utterance direction determination program may be stored in an external server and loaded into the primary storage section 52 over a network. A program such as the utterance direction determination program may be stored on a digital versatile disc (DVD) or other non-transitory recording medium and loaded into the primary storage section 52 through a recording medium reading device.

The external interface 54 is coupled to external devices, and governs the transmission and reception of various information between the external devices and the CPU 51. The external interface 54 is coupled to the mics 55A and 55B, and to a speaker 56. The mics 55A and 55B and the speaker 56 need not be external devices, and may be built in the utterance direction determination device 10.

The mics 55A and 55B are examples of the voice input sections 21A and 21B, detect a voice uttered by the user, and convert the detected voice to a voice signal. The speaker 56 generates a voice to report an utterance direction determination result outputted from the utterance direction determination device 10.

Figure 8B:
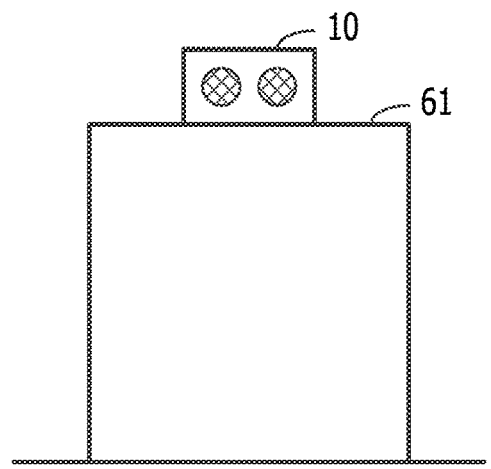
FIG. 8B is a conceptual diagram illustrating an environment including an utterance direction determination device.

The utterance direction determination device 10 may be, for example, built in a smart speaker or other voice-activated device, or may be disposed in the vicinity of a voice-activated device 61 as illustrated in FIG. 8B. FIG. 8B illustrates an example in which the utterance direction determination device 10 is disposed on the upper surface of the voice-activated device 61. However, the utterance direction determination device 10 may alternatively be disposed on the front surface of the voice-activated device 61. When the utterance direction determination device 10 is disposed in the vicinity of the voice-activated device 61, the utterance direction determination device 10 is coupled to the voice-activated device 61 in a wired or wireless manner.

Figure 9:
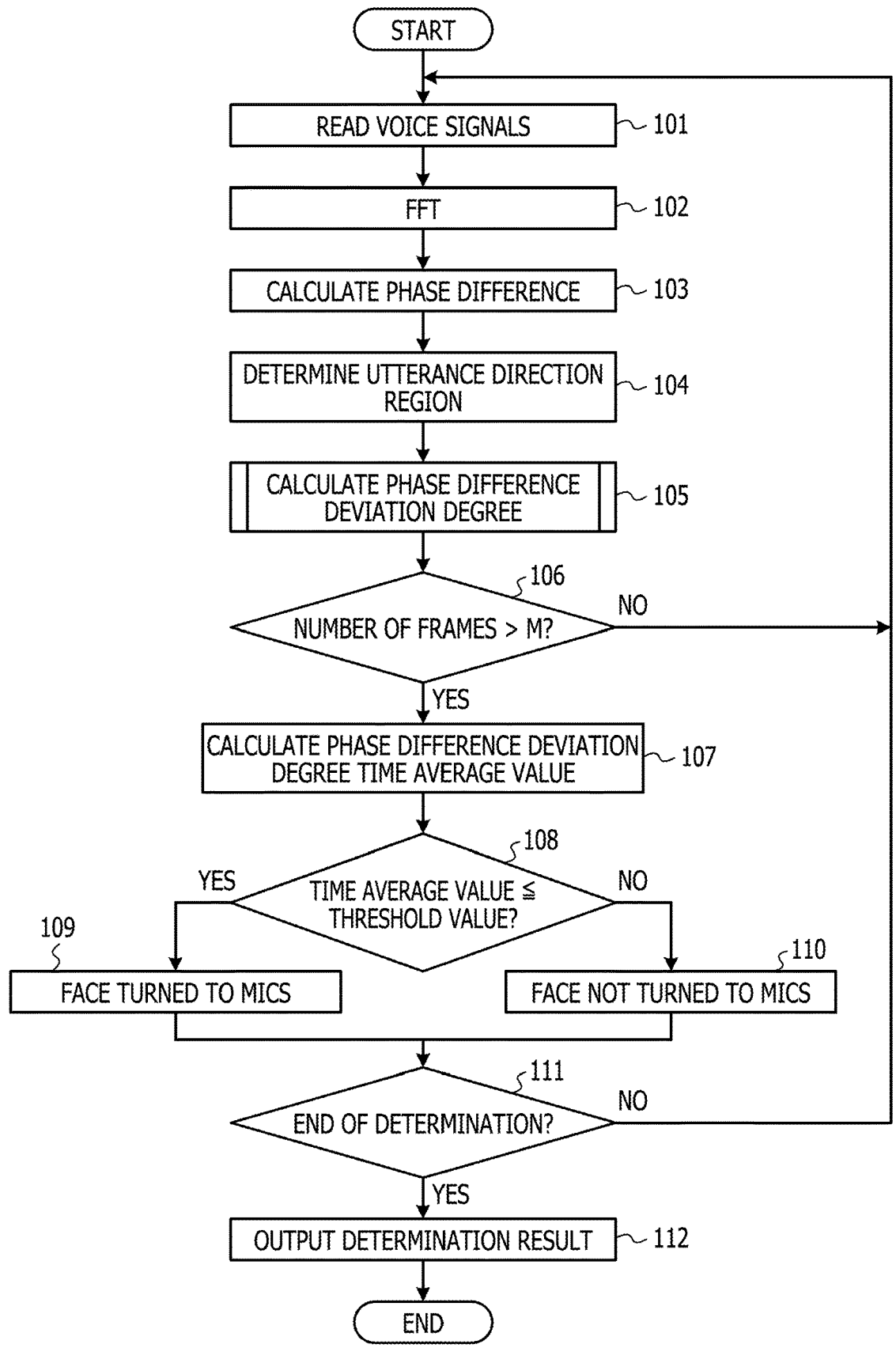
FIG. 9 is a flowchart illustrating an example of an utterance direction determination process according to the first embodiment.

Operations in an utterance direction determination process will now be outlined. FIG. 9 illustrates a flow of an utterance direction determination process. In step 101, the CPU 51 reads one frame of each of the voice signals INTA and INTB that correspond to voices detected respectively by the mics 55A and 55B.

In step 102, the CPU 51 subjects the read voice signals INTA and INTB to time frequency conversion in order to obtain the frequency signals INFA and INFB. The description given here relates to an example in which time frequency conversion is performed by using the FFT. In step 103, the CPU 51 calculates the phase difference between the frequency signals INFA and INFB.

In step 104, the CPU 51 determines an utterance direction region. In step 105, the CPU 51 calculates a phase difference deviation degree average value as described later. In step 106, the CPU 51 determines whether or not a given number of frames M is exceeded by the number of frames read in step 101. If the determination in step 106 is negative, for example, the given number of frames M is not exceeded by the number of frames read in step 101, the CPU 51 returns to step 101.

If the determination in step 106 is affirmative, for example, the given number of frames M is exceeded by the number of frames read in step 101, the CPU 51 calculates the phase difference deviation degree time average value in step 107. In step 108, the CPU 51 determines whether or not the phase difference deviation degree time average value is equal to or smaller than a given threshold value.

If the determination in step 108 is affirmative, for example, the phase difference deviation degree time average value is equal to or smaller than the given threshold value, the CPU 51 determines in step 109 that the face of the user is turned to the mics, and sets, for example, an utterance direction determination flag to "1." If the determination in step 108 is negative, for example, the phase difference deviation degree time average value is greater than the given threshold value, the CPU 51 determines in step 110 that the face of the user is not turned to the mics, and sets, for example, the utterance direction determination flag to "0." The utterance direction determination flag may be included in the data storage area 53B of the secondary storage section 53 depicted in FIG. 8A.

In step 111, the CPU 51 determines whether or not, for example, a given button is pressed by the user to issue an instruction for terminating the utterance direction determination process. If the determination in step 111 is negative, the CPU 51 returns to step 101.

If the determination in step 111 is affirmative, the CPU 51 outputs a signal indicative of the result of determination and terminates the utterance direction determination process in accordance with the value of the utterance direction determination flag. The signal indicative of the result of determination is inputted to the voice-activated device 61 such as a smart speaker. The voice-activated device 61 operates in response to a voice uttered by the user when the result of determination indicates that the face of the user is turned to the mics, or ignores the voice uttered by the user when the result of determination indicates that the face of the user is not turned to the mics.

Consequently, a voice may be accepted when the user is determined to be facing the mics and uttering the voice, and rejected when the user is determined to be not facing the mics. This makes it possible to reduce the possibility of erroneous recognition and erroneous operation not intended by the user.

The signal indicative of the result of determination may be inputted, for example, to a video conference system. The video conference system, for example, transmits a user's statement to another attendee when the result of determination indicates that the face of the user is turned to the mics, and ignores the user's statement when the result of determination indicates that the face of the user is not turned to the mics.

The signal indicative of the result of determination may be inputted, for example, to a voice recognition device. The voice recognition device, for example, performs voice recognition on a voice uttered by the user when the result of determination indicates that the face of the user is turned to the mics, and ignores the voice uttered by the user when the result of determination indicates that the face of the user is not turned to the mics.

The signal indicative of the result of determination may be inputted, for example, to a safety confirmation system. When, for example, the result of determination indicates that the face of the user is turned to the mics, the safety confirmation system determines that the user is safe. When, for example, the result of determination indicates that the face of the user is not turned to the mics for a given period of time, the safety confirmation system may notify the user through the speaker 56 or an image output device for outputting text or images that the user is requested to utter a voice to the mics.

Figure 10:
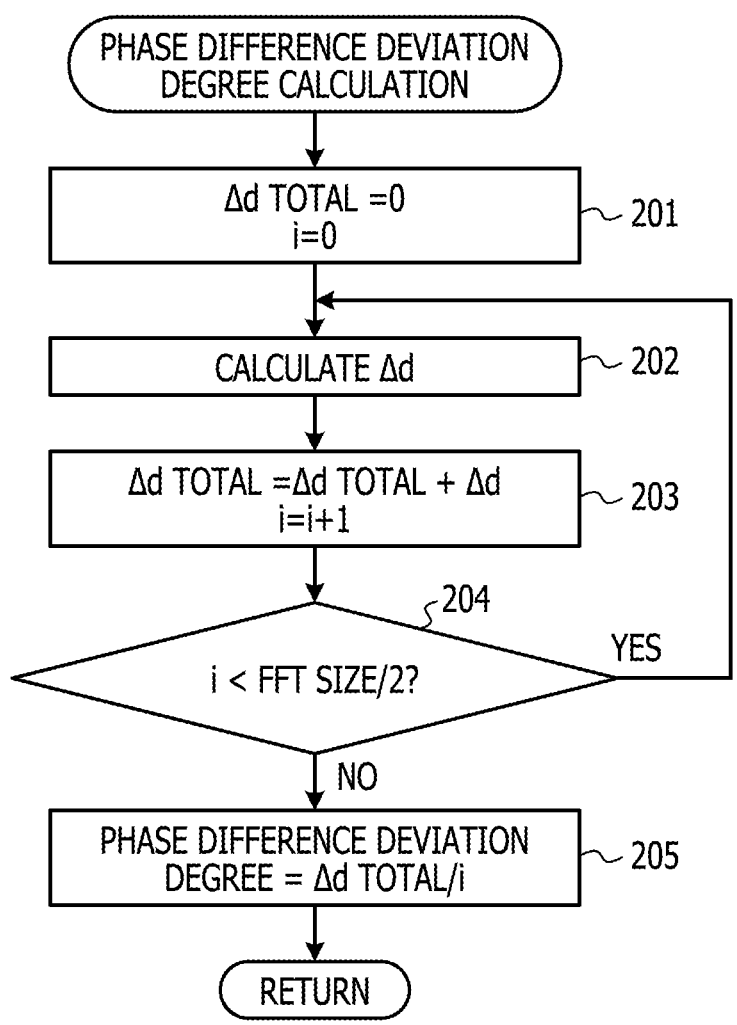
FIG. 10 is a flowchart illustrating an example of a phase difference deviation degree calculation process according to the first and second embodiments.

FIG. 10 illustrates the flow of a phase difference deviation degree calculation process that is performed in step 105 of FIG. 9. In step 201, the CPU 51 sets the value 0 as a Δd total and as a variable i. The Δd total is used to store an individual phase difference deviation degree total value. The variable i is used to count the number of frequency bins. In step 202, the CPU 51 calculates the individual phase difference deviation degree Δd for each frequency bin number i. The individual phase difference deviation degree Δd represents the degree by which the phase difference between the frequency signals INFA and INFB is deviated from the utterance direction region. If the phase difference between the frequency signals INFA and INFB exists within the utterance direction region, Δd=0.

In step 203, the CPU 51 adds the value of Δd to the value of the Δd total and adds the value 1 to the value of the variable i. In step 204, the CPU 51 determines whether or not the value of the variable i is smaller than the maximum frequency bin number, for example, is smaller than FFT size/2. If the determination in step 204 is affirmative, indicating that the value of the variable i is smaller than FFT size/2, the CPU 51 returns to step 202. If the determination in step 204 is negative, for example, the value of the variable i is equal to or greater than FFT size/2, the CPU 51 calculates, in step 205, the phase difference deviation degree average value by dividing the value of the Δd total by the value of the variable i.

Based on the phase difference deviation degree time average value calculated from the phase difference deviation degree of M frames, a check is performed in step 108 to determine whether or not the user is uttering a voice to the mics. However, an alternative is to repeat the determination in step 108 and, if it is determined more than a given number of times that the phase difference deviation degree time average value is equal to or smaller than the given threshold value, determine that the user is uttering a voice to the mics. Another alternative is to repeat the determination in step 108 and, if it is determined with a probability higher than a given probability that the phase difference deviation degree time average value is equal to or smaller than the given threshold value, determine that the user is uttering a voice to the mics. For example, a statistical value indicative of the individual phase difference deviation degree, such as an individual phase difference deviation degree median calculated from the phase difference deviation degree of M frames, may be used instead of the phase difference deviation degree time average value calculated from the phase difference deviation degree of M frames.

The present embodiment determines, for each frame, the utterance direction region in accordance with the phase difference between each given frequency of first and second frequency signals and performs, for a plurality of frames, a process of calculating the first phase difference deviation degree by which the phase difference of each given frequency between the first and second frequency signals is deviated from the utterance direction region. The first frequency signal corresponds to a first voice signal inputted to a first voice input section, and the second frequency signal corresponds to a second voice signal inputted to a second voice input section. The second phase difference deviation degree, which is a statistical value of a plurality of frames, is calculated from the first phase difference deviation degree of a plurality of frames. If the second phase difference deviation degree is equal to or smaller than the first threshold value, it is determined that the user is uttering a voice to the first voice input section and the second voice input section.

Consequently, even if the positional relationship between the user and the mics changes, it is possible to determine based on the voice signals detected by the mics whether or not the user is uttering a voice to the mics.

Second Embodiment

An example of a second embodiment will now be described. Elements and operations identical with those of the first embodiment will not be redundantly described. The second embodiment differs from the first embodiment in that a threshold value is set based on an estimated utterance direction.

Figure 11A:
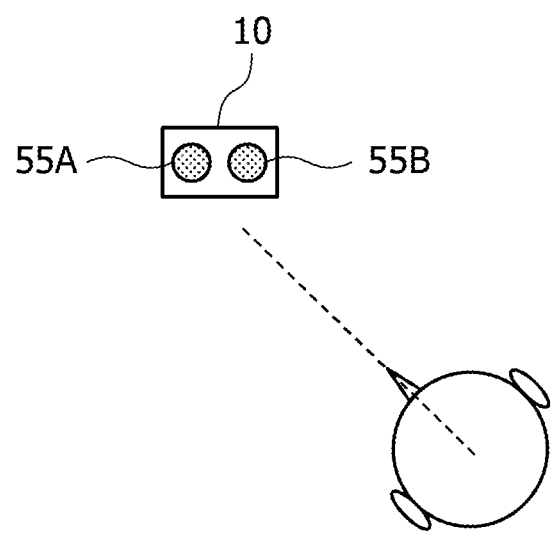
FIG. 11A is a conceptual diagram illustrating a position of a user and orientation of a user's face with respect to mics.
Figure 11B:
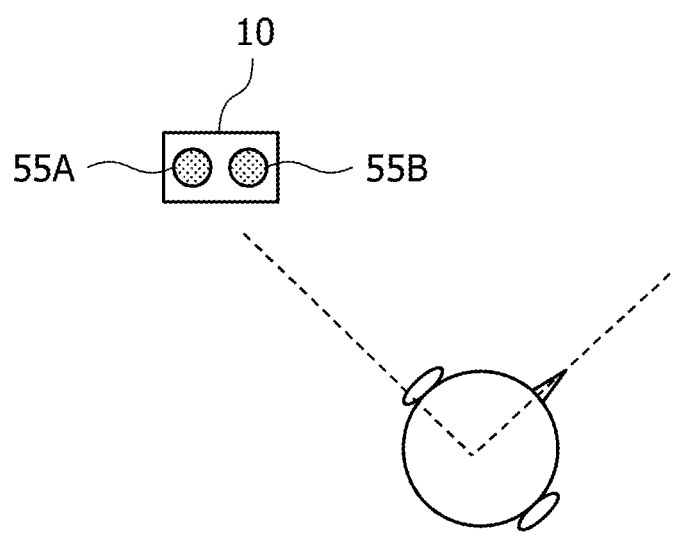
FIG. 11B is a conceptual diagram illustrating a position of a user and orientation of a user's face with respect to mics.
Figure 12A:
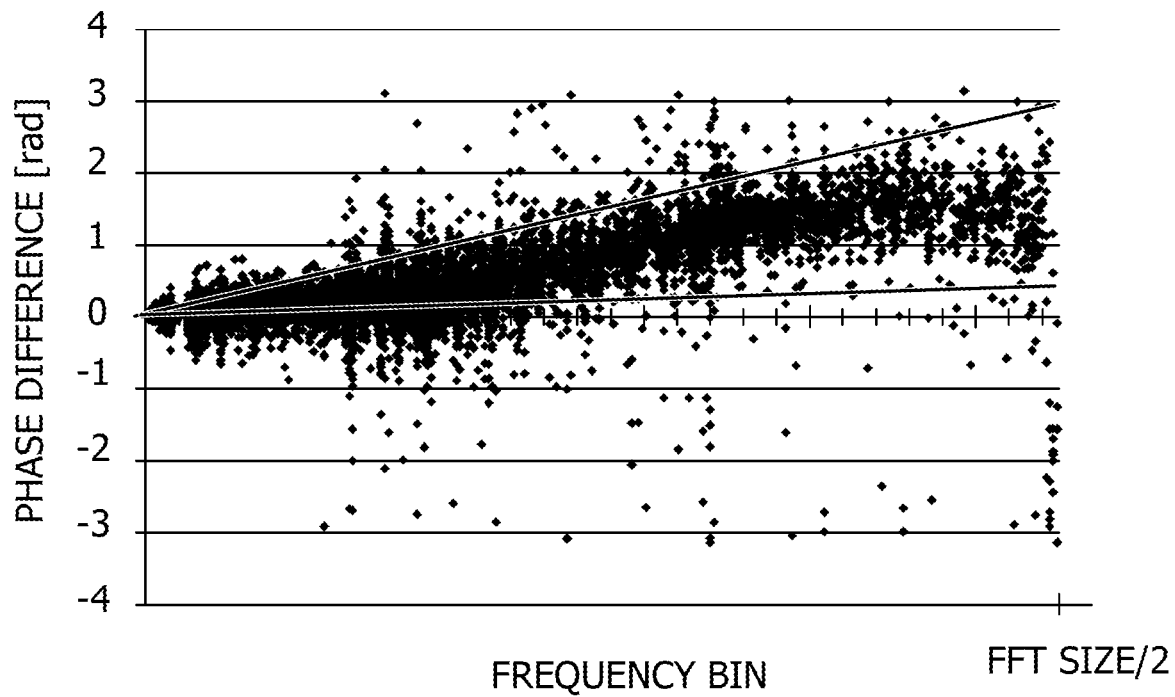
FIG. 12A is a conceptual diagram illustrating relationship between phase difference and frequency for explanation of threshold value setup.
Figure 12B:
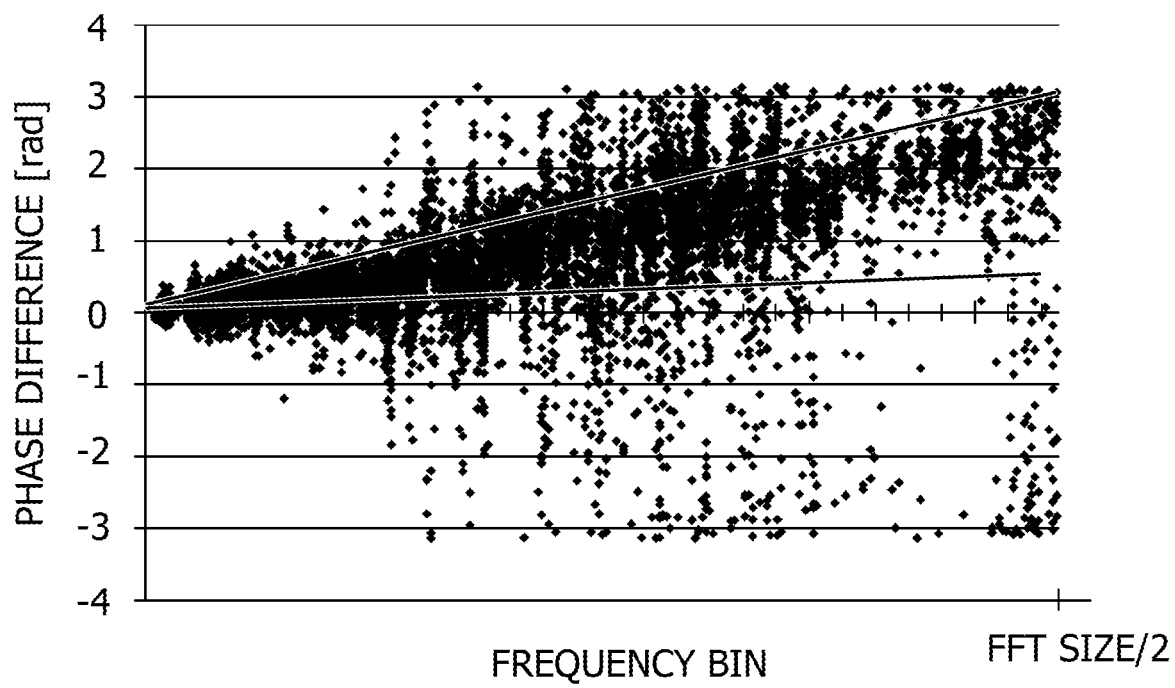
FIG. 12B is a conceptual diagram illustrating relationship between phase difference and frequency for explanation of threshold value setup.

FIG. 12A illustrates the relationship between phase difference and frequency in a case where the user is positioned to the right of the front of the mics 55 as viewed from the user, facing the mics 55, and uttering a voice as illustrated in FIG. 11A. FIG. 12B illustrates the relationship between phase difference and frequency in a case where the user is positioned to the right of the front of the mics 55 as viewed from the user, facing in a rightward direction away from the mics 55, and uttering a voice as illustrated in FIG. 11B.

In contrast to FIGS. 6A and 6C, which depict a case where the user is positioned in front of the mics 55, FIGS. 12A and 12B depict a case where the phase difference between the frequency signals INFA and INFB deviated from the utterance direction region is great, and the individual phase difference deviation degree is also great.

Figure 13:
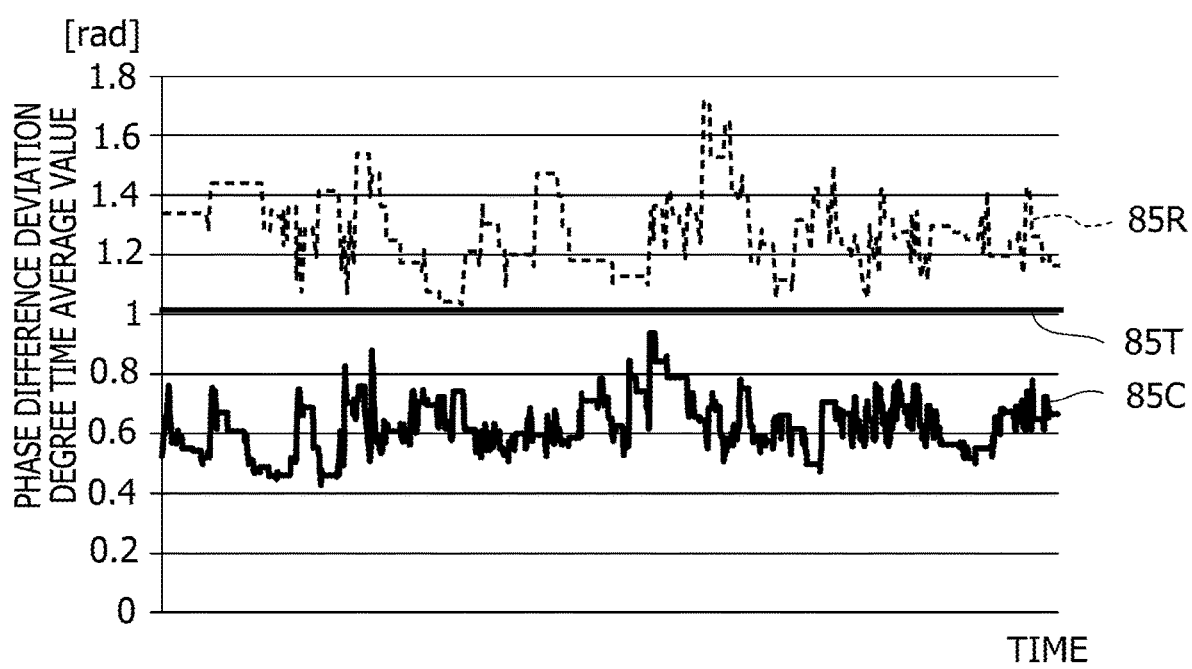
FIG. 13 is a conceptual diagram illustrating relationship between phase difference deviation degree time average value and threshold value.

FIG. 13 depicts a graph indicative of relationship between phase difference deviation degree time average value and time. A line 85R indicates the phase difference deviation degree time average value in a case where the face of the user is not turned to the mics 55 as depicted in FIG. 11B. A line 85C indicates the phase difference deviation degree time average value in a case where the face of the user is turned to the mics 55 as depicted in FIG. 11A.

The line 85R represents an overall greater value than the line 84R in FIG. 7. The line 85C represents an overall greater value than the line 84C in FIG. 7. Therefore, using a threshold value greater than the threshold value 84T depicted in FIG. 7 makes it possible to properly distinguish between the line 85R and the line 85C and thus determine the orientation of the user's face.

Figure 14:
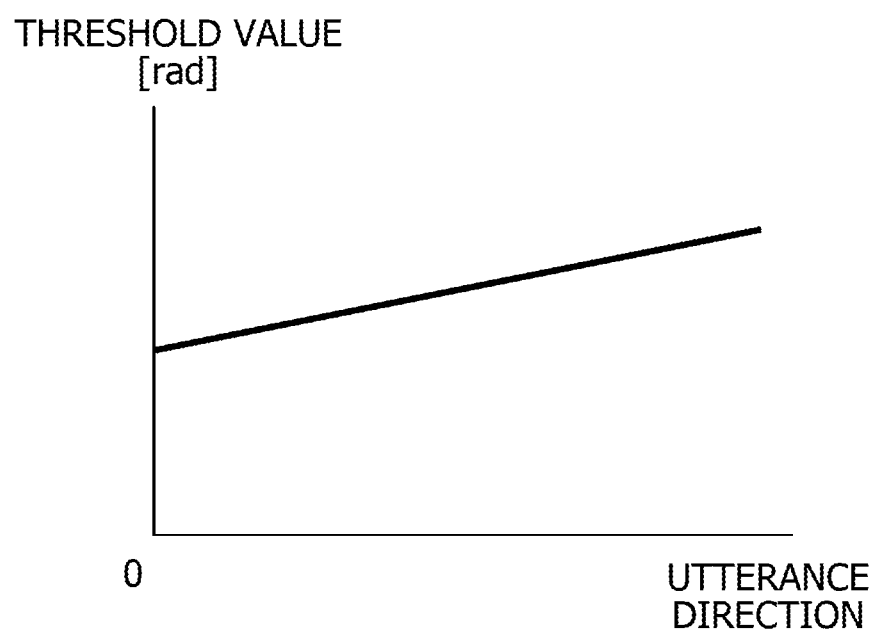
FIG. 14 is a conceptual diagram illustrating relationship between threshold value and utterance direction.

FIG. 14 depicts a graph indicative of relationship between a threshold value and a user's position. The vertical axis of FIG. 14 represents the threshold value [rad], and the horizontal value represents the utterance direction, which indicates the user's position. When the user is positioned in front of the mics 55, the utterance direction is represented by the value 0. The value indicative of the utterance direction increases when the user moves rightward or leftward away from the front of the mics 55. Accordingly, the threshold value increases when the user's position moves rightward or leftward away from the front of the mics 55.

The threshold value is calculated, for example, by Equation (3).

$$\text{Threshold value} = \text{adjustment value} \times p + \text{basic threshold value} \quad (3)$$

The basic threshold value is a threshold value in a case where the user is positioned in front of the mics 55 and thus the utterance direction is 0 as depicted in FIG. 14. The adjustment value represents the slope of a line indicative of the threshold value in FIG. 14.

Figure 15A:
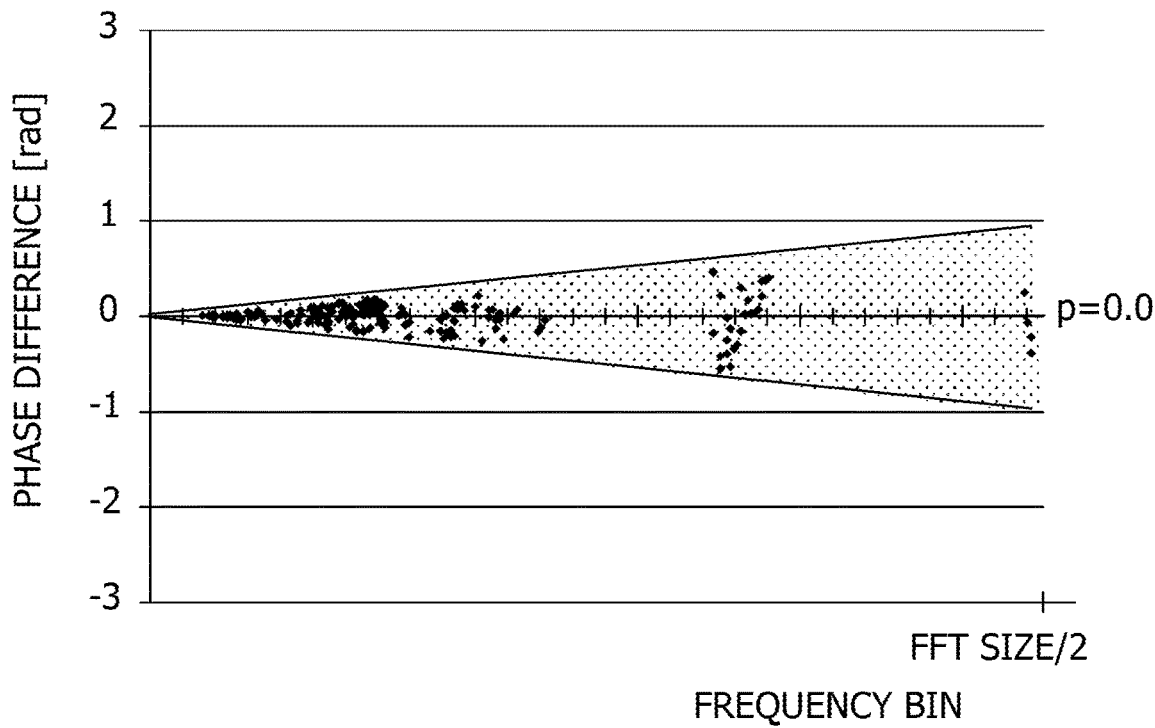
FIG. 15A is a conceptual diagram illustrating relationship between phase difference and frequency for explanation of threshold value setup.
Figure 16A:
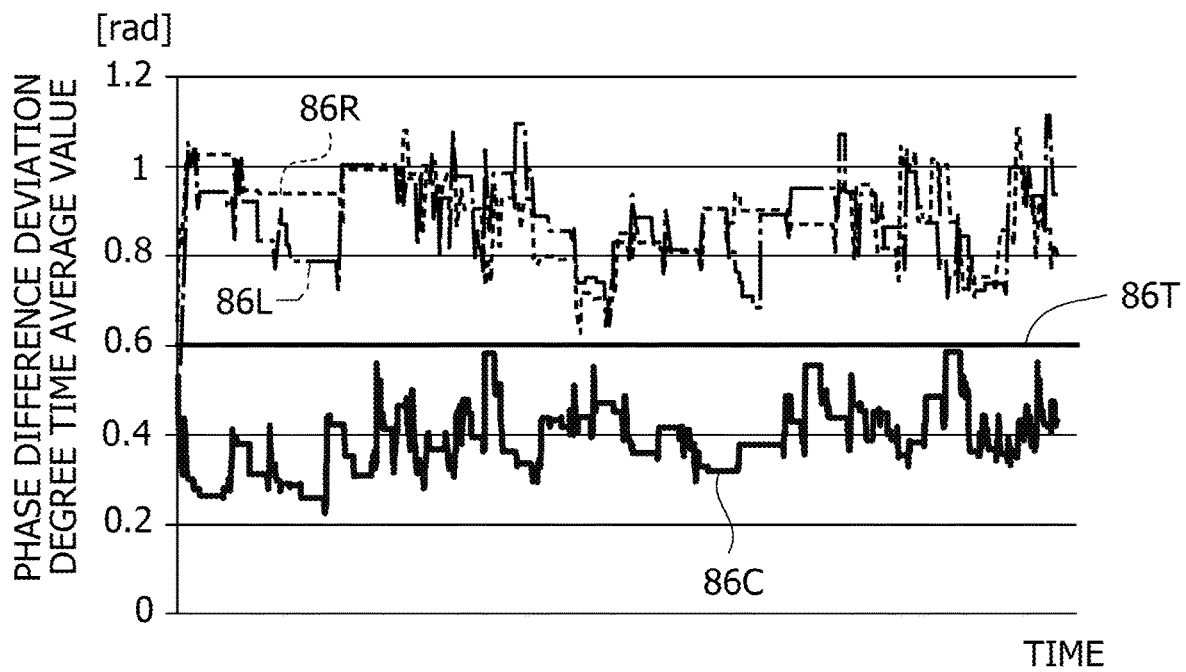
FIG. 16A is a conceptual diagram illustrating relationship between phase difference deviation degree time average value and time for explanation of threshold value setup.

If, for example, the adjustment value is 0.25, the basic threshold value is 0.6 [rad], and the utterance direction phase difference p=0.0 as illustrated in FIG. 15A, and thus the user is positioned in front of the mics 55, the threshold value is 0.6 (=0.25×0.0+0.6) [rad]. Accordingly, as illustrated in FIG. 16A, a threshold value 86T is set to 0.6 so as to distinguish between lines 86R and 86L and the phase difference deviation degree time average value depicted by a line 86C in a case where the user is facing the mics. The line 86R depicts the phase difference deviation degree time average value in a case where the user is facing rightward.

The line 86L depicts the phase difference deviation degree time average value in a case where the user is facing leftward.

Figure 15B:
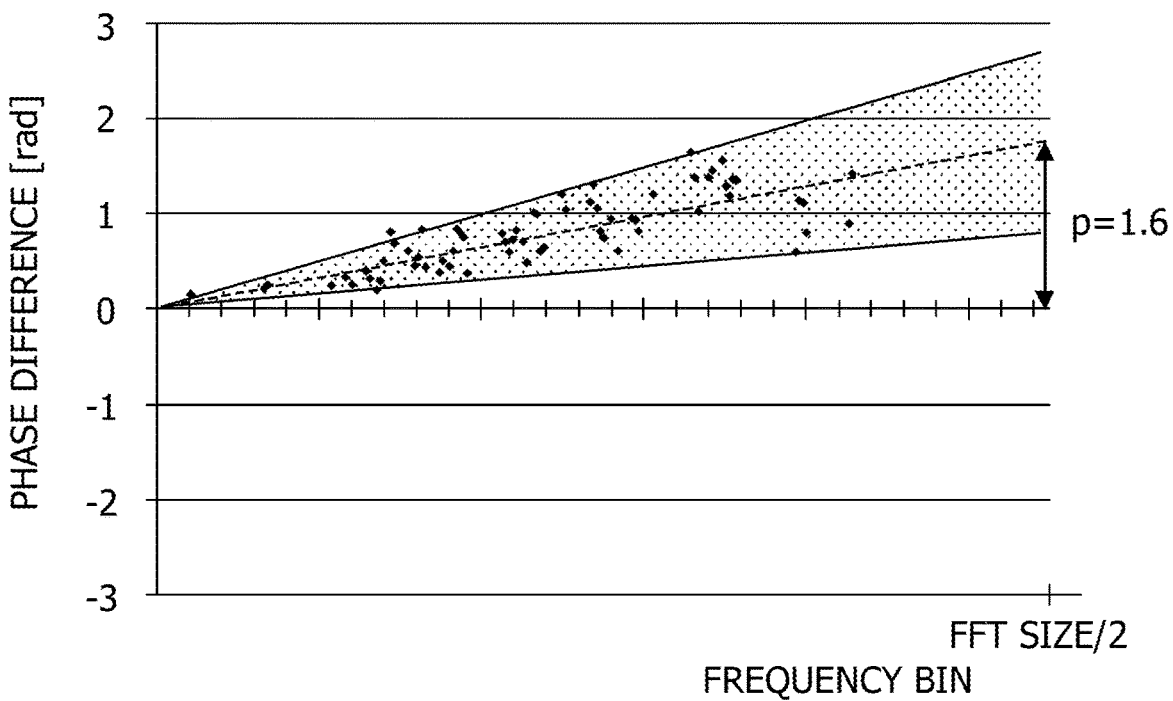
FIG. 15B is a conceptual diagram illustrating relationship between phase difference and frequency for explanation of threshold value setup.
Figure 16B:
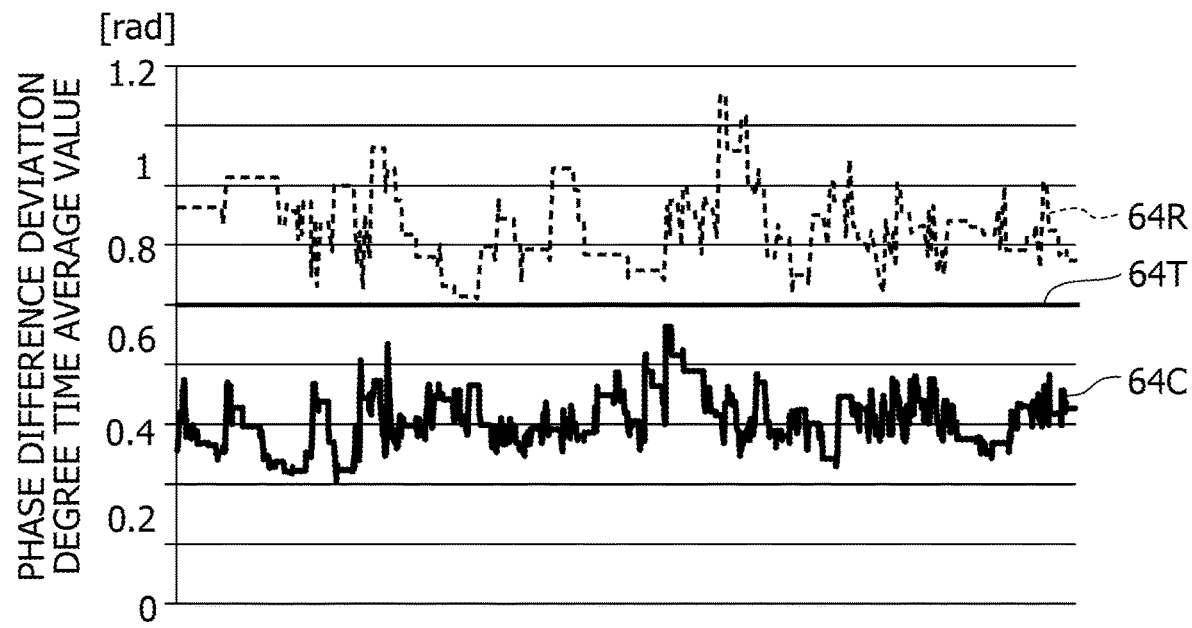
FIG. 16B is a conceptual diagram illustrating relationship between phase difference deviation degree time average value and time for explanation of threshold value setup.

If, for example, the adjustment value is 0.25, the basic threshold value is 0.6 [rad], and the utterance direction phase difference p=1.6 as illustrated in FIG. 15B, and thus the user is positioned to the right of the front of the mics 55 as viewed from the user, the threshold value is 1.0 (=0.25×1.6+0.6). As illustrated in FIG. 16B, a threshold value 64T is set to 1.0 so as to distinguish between the phase difference deviation degree time average value depicted by a line 64R in a case where the user is facing rightward and the phase difference deviation degree time average value depicted by a line 64C in a case where the user is facing the mics.

Figure 17:
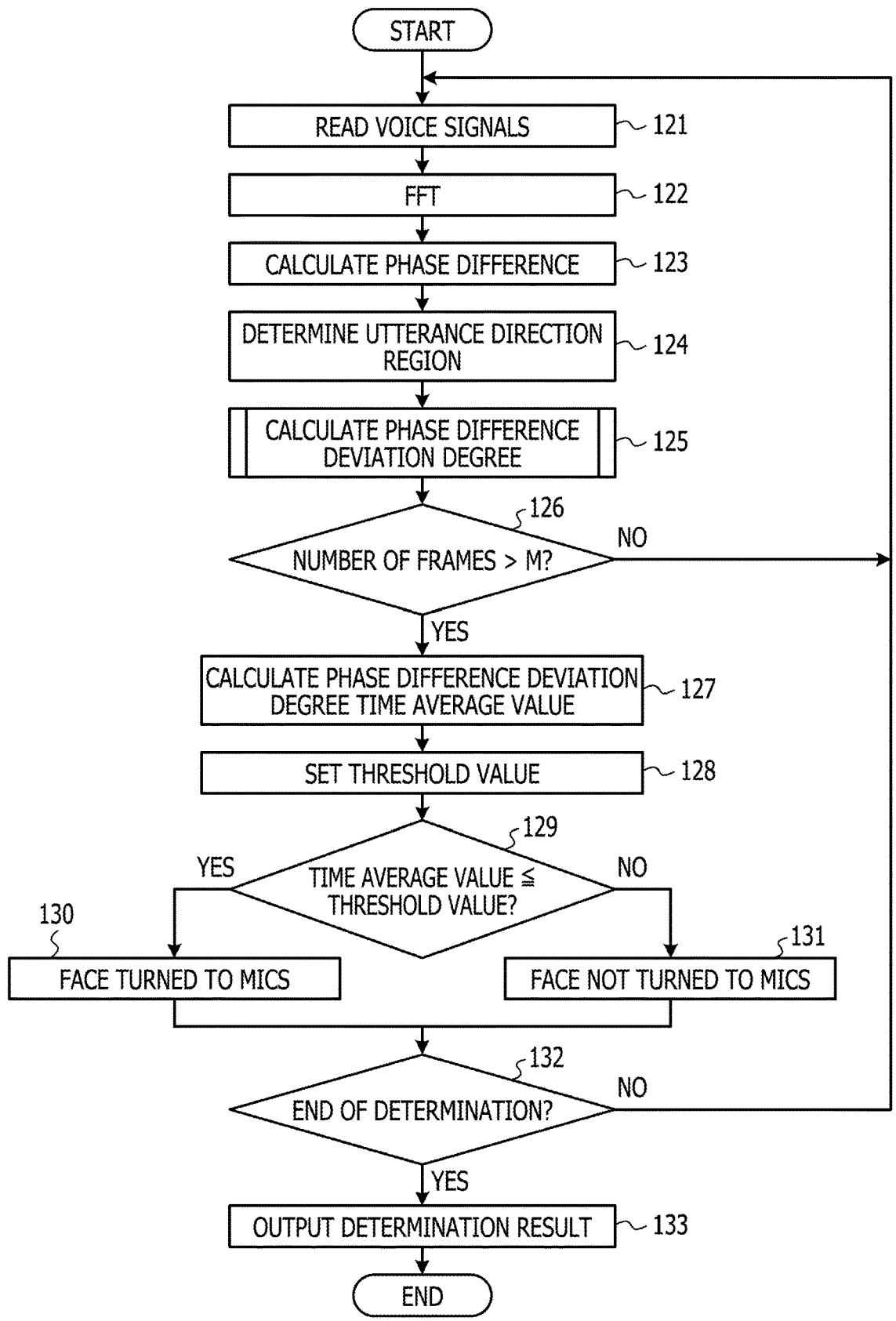
FIG. 17 is a flowchart illustrating an example of an utterance direction determination process according to the second embodiment.

FIG. 17 illustrates a flow of an utterance direction determination process according to the second embodiment. Steps 121 to 127 are similar to steps 101 to 107 in FIG. 9 and will not be redundantly described. In step 128, the CPU 51 sets a threshold value, for example, by using Equation (3). In step 129, the threshold value set in step 128 is used to determine whether or not the threshold value is exceeded by the phase difference deviation degree time average value. Steps 130 to 133 are similar to steps 109 to 112 in FIG. 9 and will not be redundantly described.

The second embodiment sets the threshold value in accordance with the phase difference of each frequency bin and with the difference between the utterance direction phase difference in a case where the user is positioned in front of the mics and the utterance direction phase difference in a case where the user is positioned away from the front of the mics.

Consequently, it is possible to absorb an increase in the phase difference deviation degree time average value due to the displacement of the user from the front of the mics. Therefore, even if the positional relationship between the user and the mics is changed, whether or not the user is uttering a voice to the mics may be properly determined based on the voice signals acquired by the mics.

Third Embodiment

An example of a third embodiment will now be described. Elements and operations identical with those of the first or second embodiment will not be redundantly described. The third embodiment differs from the first and second embodiments in that the phase difference deviation degree is calculated by using the phase difference between frequency signals having a frequency not lower than a given frequency.

The third embodiment sets a threshold value Fth that distinguishes between a low frequency band and a high frequency band. The threshold value Fth is an example of a second threshold value and may be a fixed value, for example, 100 [kHz]. However, an alternative is to automatically vary a provisional threshold value PFth while the user is uttering a voice, calculate the phase difference deviation degree time average value, determine the provisional threshold value PFth that provides a phase difference deviation degree time average value of 0.5 [rad] or smaller for a given period of time, and set the determined provisional threshold value PFth as the threshold value Fth.

Figure 18:
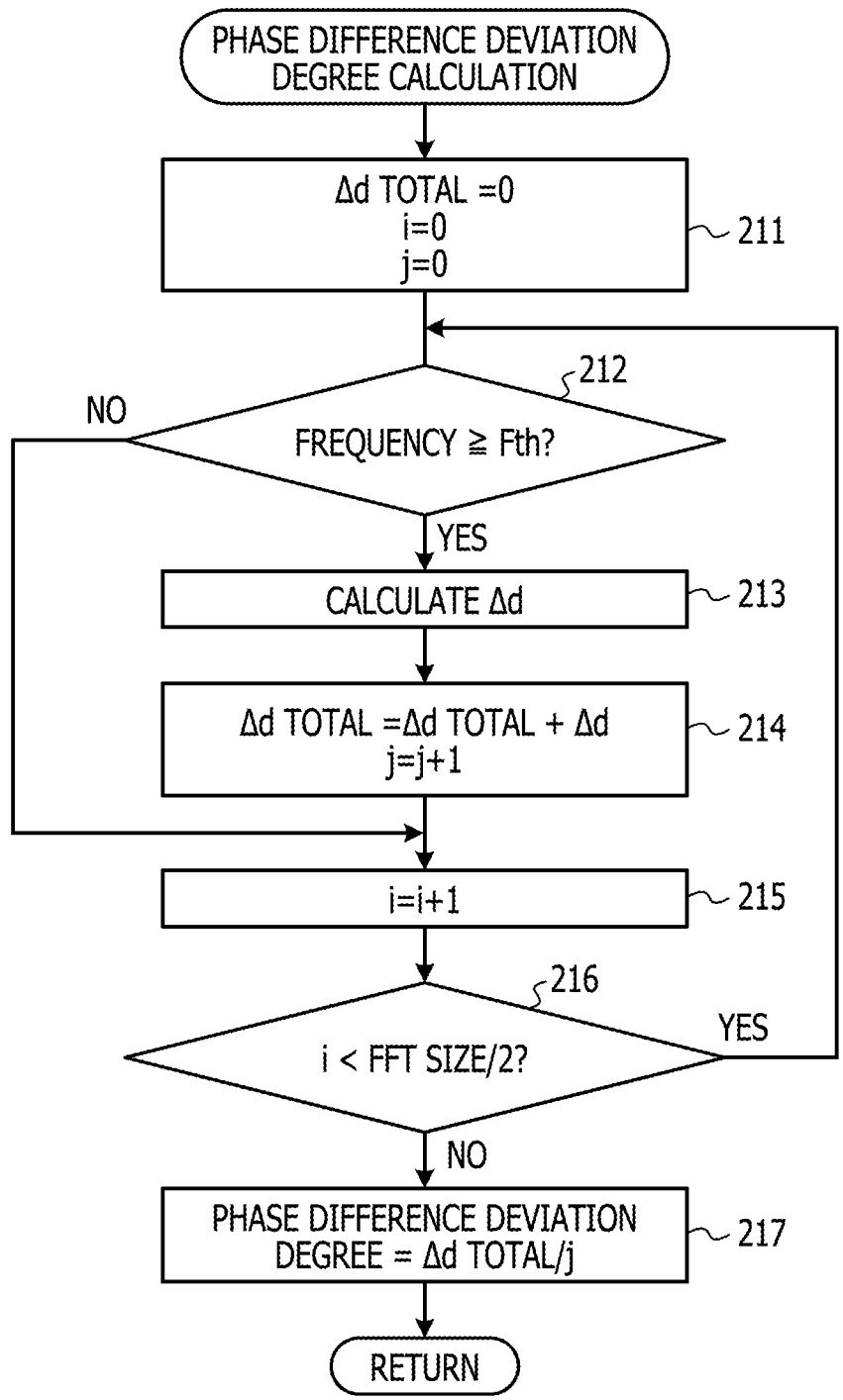
FIG. 18 is a flowchart illustrating an example of a phase difference deviation degree calculation process according to the third embodiment.

FIG. 18 illustrates the flow of the phase difference deviation degree calculation process in step 105 of FIG. 9 or step 125 of FIG. 17. In step 211, the CPU 51 sets the value 0 for the $\Delta d$ total, which is used to calculate the sum of values indicative of the individual phase difference deviation degree $\Delta d$, the variable i, which is used to count the number of frequency bins, and a variable j, which is used to count the number of high frequency bins. In step 212, the CPU 51 determines whether or not frequencies corresponding to a frequency bin associated with the value of the variable i is equal to or higher than the given frequency Fth.

If the determination in step 212 is negative, for example, the frequencies corresponding to the frequency bin associated with the value of the variable i are lower than the given frequency Fth, the CPU 51 proceeds to step 215. If the determination in step 212 is affirmative, for example, the frequencies corresponding to the frequency bin associated with the value of the variable i are equal to or higher than the given frequency Fth, the CPU 51 calculates the individual phase difference deviation degree Δd. The individual phase difference deviation degree Δd is the degree by which the phase difference between the frequency signals INFA and INFB having the frequency bin number i is deviated from the utterance direction region.

In step 214, the CPU 51 adds Δd to the value of the Δd total, and adds 1 to the value of the variable j. In step 215, the CPU 51 adds 1 to the value of the variable i. In step 216, the CPU 51 determines whether or not the value of the variable i is smaller than the maximum frequency bin number, for example, FFT size/2. If the determination in step 216 is affirmative, the CPU 51 returns to step 212. If the determination in step 216 is negative, the CPU 51 calculates, in step 217, the phase difference deviation degree by dividing the value of the Δd total by the value of the variable j.

The third embodiment may be combined with the first or second embodiment.

In a case where the positional relationship between the user and the mics remains unchanged, the amount of reflected sound is smaller than the amount of direct sound when the user utters a voice to the mics, and the amount of reflected sound is greater than the amount of direct sound when the user utters a voice without facing the mics. This characteristic is prominent in medium and high frequency bands. In some cases, there may be a significant difference between theoretical values and measured values of frequency signals in a low frequency band.

Consequently, as the third embodiment calculates the phase difference deviation degree by using the phase difference between frequency signals in a high frequency band having frequencies higher than a given frequency and without using frequency signals in a low frequency band, it is possible to calculate a more accurate phase difference deviation degree time average value. Accordingly, even in a case where the positional relationship between the user and the mics is changed, whether or not the user is uttering a voice to the mics may be determined more properly based on the voice signals acquired by the mics.

Fourth Embodiment

An example of a fourth embodiment will now be described. Elements and operations identical with those of the first, second, or third embodiment will not be redundantly described. The fourth embodiment differs from the first to third embodiments in that the phase difference deviation degree is calculated by using the phase difference between frequency signals having an amplitude greater than a given amplitude threshold value.

If, for example, the amplitude of the frequency signal INFA corresponding to the voice signal INTA detected by the mic 55A is greater than the amplitude threshold value Vth, the fourth embodiment calculates the phase difference deviation degree by using the phase difference between the frequency signals INFA and INFB. Alternatively, however, the phase difference deviation degree may be calculated by using the phase difference between the frequency signals INFA and INFB in a case where the amplitude of the frequency signal INFB corresponding to the voice signal INTB detected by the mic 55B is greater than the amplitude threshold value Vth. Still alternatively, the phase difference deviation degree may be calculated by using the phase difference between the frequency signals INFA and INFB in a case where the amplitudes of the frequency signals INFA and INFB are both greater than the amplitude threshold value Vth. The amplitude threshold value Vth is an example of a third threshold value and may be, for example, a stationary noise level. The stationary noise level may be calculated by an existing method.

Figure 19:
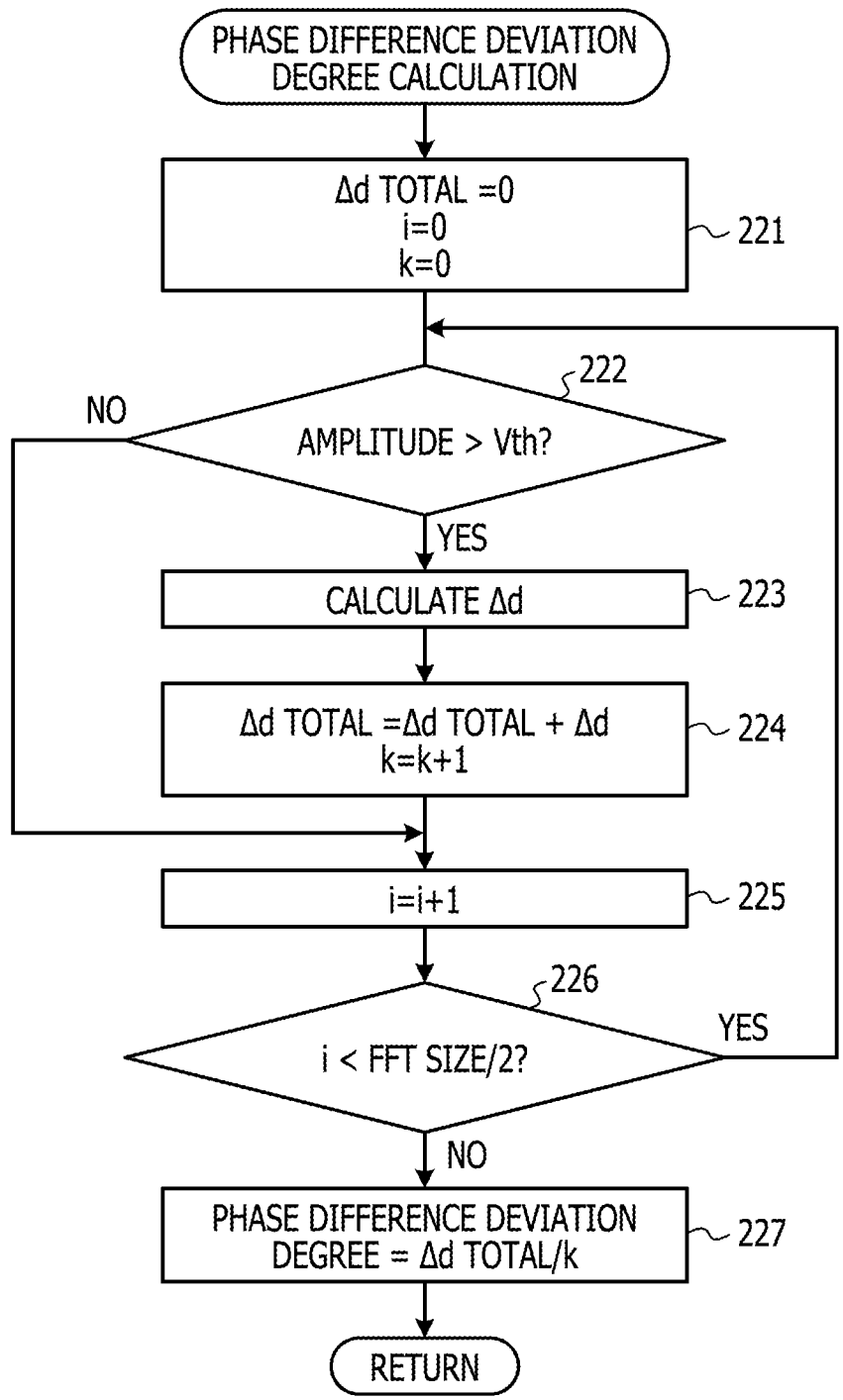
FIG. 19 is a flowchart illustrating an example of a phase difference deviation degree calculation process according to the fourth embodiment.

FIG. 19 illustrates the flow of the phase difference deviation degree calculation process in step 105 of FIG. 9 or step 125 of FIG. 17. In step 221, the CPU 51 sets the value 0 for the Δd total, which is used to calculate the sum of values indicative of the individual phase difference deviation degree Δd, the variable i, which is used to count the number of frequency bins, and a variable k, which is used to count the number of frequency bins having an amplitude greater than the amplitude threshold value Vth.

In step 222, the CPU 51 determines whether or not the amplitude threshold value Vth is exceeded by the amplitude of a frequency signal corresponding to the voice signal detected, for example, by the mic 55A. If the determination in step 222 is negative, the CPU 51 proceeds to step 225. If the determination in step 222 is affirmative, the CPU 51 calculates the individual phase difference deviation degree Δd, which is the degree by which the phase difference between the frequency signals INFA and INFB having the frequency bin number i is deviated from the utterance direction region.

In step 224, the CPU 51 adds Δd to the value of the Δd total, and adds 1 to the value of the variable k. In step 225, the CPU 51 adds 1 to the value of the variable i. In step 226, the CPU 51 determines whether or not the value of the variable i is smaller than the maximum frequency bin number, for example, FFT size/2. If the determination in step 226 is affirmative, for example, the value of the variable i is smaller than the maximum frequency bin number, the CPU 51 returns to step 222. If the determination in step 226 is negative, for example, the value of the variable i is equal to or greater than the maximum frequency bin number, the CPU 51 calculates, in step 227, the phase difference deviation degree by dividing the value of the Δd total by the value of the variable k.

The present embodiment has been described with reference to an example in which the phase difference deviation degree is calculated by using the phase difference between frequency signals having an amplitude greater than the amplitude threshold value. However, the present embodiment is not limited to such an example. When, for example, the amplitudes of voice signals are greater than the given threshold value, the phase difference deviation degree may be calculated by using the phase difference between frequency signals corresponding to the voice signals. Another alternative is to calculate the phase difference deviation degree by using the phase difference between frequency signals having power greater than a given threshold value and disregarding the amplitudes of frequency signals or voice signals.

The fourth embodiment may be applied to the first embodiment, the second embodiment, the combination of the first and third embodiments, or the combination of the second and third embodiments.

The fourth embodiment calculates the phase difference deviation degree when the amplitudes of frequency signals are greater than the given amplitude threshold value. Therefore, it is possible to calculate a more accurate phase difference deviation degree time average value based on frequency signals that are highly unlikely to be noise. Consequently, even in a case where the positional relationship between the user and the mics is changed, whether or not the user is uttering a voice to the mics may be determined more properly based on voice signals acquired by the mics.

The flowcharts of FIGS. 9, 10, and 17 to 19 are merely examples. The order of processing may be changed as appropriate.

Verification Example

The result of utterance direction determination according to the present embodiment is illustrated in FIG. 20. In this verification, the user utters a voice for 40 seconds at a location 50 cm apart from the mics, and the sampling frequency is 22 [kHz].

Figure 21A:
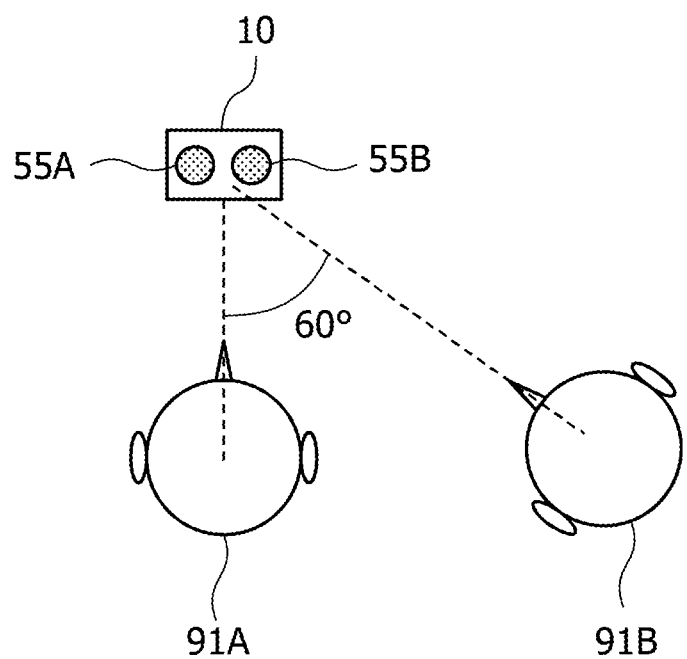
FIG. 21A is a conceptual diagram illustrating verification of the fourth embodiment.
Figure 21B:
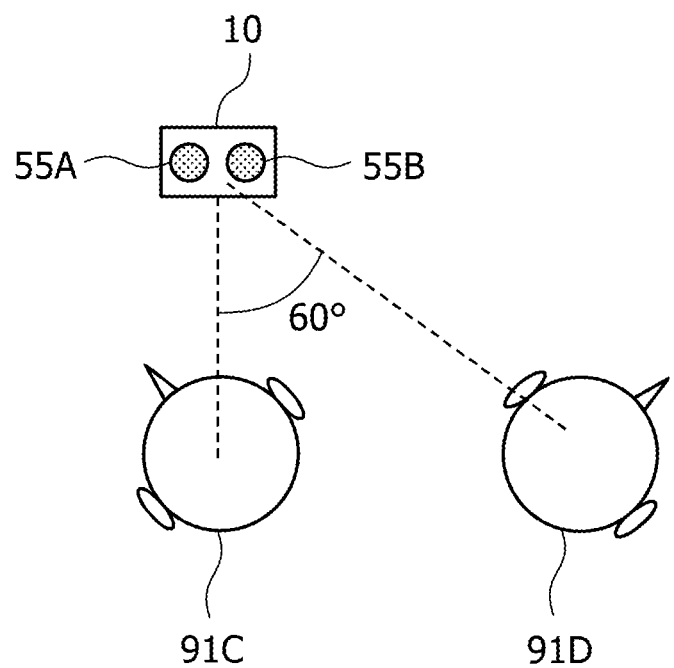
FIG. 21B is a conceptual diagram illustrating verification of the fourth embodiment.

A user 91A illustrated in FIG. 21A and a user 91C illustrated in FIG. 21B exist on a straight line that is extended from the front of the mics 55, for example, the intermediate position between the mics 55A and 55B, to the front of the utterance direction determination device 10. Users 91B and 91D exist on a straight line that crosses, at an angle of 60 degrees at a point of intersection centered between the mics 55A and 55B, a straight line that is extended from a location shifted from the front of the mics 55, for example, the intermediate position between the mics 55A and 55B, to the front of the utterance direction determination device 10.

When the user is positioned in front of the mics 55 and facing the mics 55 like the user 91A, the orientation of the user's face is properly determined with a probability of 95%. When the user is positioned to the right of the front of the mics 55 and facing the mics 55 like the user 91B, the orientation of the user's face is properly determined with a probability of 93%.

When the user is positioned in front of the mics 55 and facing to the left, for example, the user is not facing the mics 55 like the user 91C, the orientation of the user's face is properly determined with a probability of 92%. When the user is positioned to the right of the front of the mics 55 and facing to the right, for example, the user is not facing the mics 55 like the user 91D, the orientation of the user's face is properly determined with a probability of 91%.

Accordingly, the present embodiment properly determines the position of the user and the orientation of the user's face with a probability of 90% or higher in any situation.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method for determining an utterance direction, the method comprising:

executing a first calculation process that includes
determining, for each frame, an utterance direction region in accordance with a phase difference of each given frequency between a first frequency signal and a second frequency signal, the first frequency signal corresponding to a first voice signal inputted to a first voice input section, the second frequency signal corresponding to a second voice signal inputted to a second voice input section, and performing, for a plurality of frames, a process of calculating a first phase difference deviation degree, the first phase difference deviation degree indicating the degree by which the phase difference of each given frequency is deviated from the utterance direction region;

executing a second calculation process that includes calculating a second phase difference deviation degree from the first phase difference deviation degree of the plurality of frames, the second phase difference deviation degree being a statistical value of the plurality of frames; and executing an utterance direction determination process that includes, when the second phase difference deviation degree is equal to or smaller than a first threshold value, determining that a user is uttering a voice to the first voice input section and the second voice input section.

2. The method according to claim 1, wherein the first calculation process is configured to acquire the first frequency signal by performing time frequency conversion on one frame of the first voice signal inputted to the first voice input section, and the second calculation process is configured to acquire the second frequency signal by performing time frequency conversion on one frame of the second voice signal that is inputted to the second voice input section and corresponds to the one frame of the first voice signal.

3. The method according to claim 1, wherein the utterance direction determination process is configured to set the first threshold value in accordance with the difference between a first utterance direction phase difference and a second utterance direction phase difference, the first utterance direction phase difference arising when the user is positioned in front of the first and second voice input sections, the second utterance direction phase difference arising when the user is positioned away from the front of the first and second voice input sections.

4. The method according to claim 1, wherein the first calculation process is configured to calculate the first phase difference deviation degree by using the phase difference between the first and second frequency signals corresponding to a frequency higher than a second threshold value.

5. The method according to claim 1, wherein the first calculation process is configured to calculate the first phase difference deviation degree by using the phase difference between the first and second frequency signals when the amplitude of at least one of the first and second frequency signals is greater than a third threshold value.

6. An apparatus for determining an utterance direction, the apparatus comprising:

a memory;

a processor coupled to the memory; the processor being configured to execute a first calculation process that includes determining, for each frame, an utterance direction region in accordance with a phase difference of each given frequency between a first frequency signal and a second frequency signal, the first frequency signal corresponding to a first voice signal inputted to a first voice input section, the second frequency signal corresponding to a second voice signal inputted to a second voice input section, and performing, for a plurality of frames, a process of calculating a first phase difference deviation degree, the first phase difference deviation degree indicating the degree by which the phase difference of each given frequency is deviated from the utterance direction region;

execute a second calculation process that includes calculating a second phase difference deviation degree from the first phase difference deviation degree of the plurality of frames, the second phase difference deviation degree being a statistical value of the plurality of frames; and execute an utterance direction determination process that includes, when the second phase difference deviation degree is equal to or smaller than a first threshold value, determining that a user is uttering a voice to the first voice input section and the second voice input section.

7. The apparatus according to claim 6, wherein the first calculation process is configured to acquire the first frequency signal by performing time frequency conversion on one frame of the first voice signal inputted to the first voice input section, and the second calculation process is configured to acquire the second frequency signal by performing time frequency conversion on one frame of the second voice signal that is inputted to the second voice input section and corresponds to the one frame of the first voice signal.

8. The apparatus according to claim 6, wherein the utterance direction determination process is configured to set the first threshold value in accordance with the difference between a first utterance direction phase difference and a second utterance direction phase difference, the first utterance direction phase difference arising when the user is positioned in front of the first and second voice input sections, the second utterance direction phase difference arising when the user is positioned away from the front of the first and second voice input sections.

9. The apparatus according to claim 6, wherein the first calculation process is configured to calculate the first phase difference deviation degree by using the phase difference between the first and second frequency signals corresponding to a frequency higher than a second threshold value.

10. The apparatus according to claim 6, wherein the first calculation process is configured to calculate the first phase difference deviation degree by using the phase difference between the first and second frequency signals when the amplitude of at least one of the first and second frequency signals is greater than a third threshold value.

11. A non-transitory computer-readable storage medium for storing a program which causes a processor to perform processing determining an utterance direction, the processing comprising:

executing a first calculation process that includes determining, for each frame, an utterance direction region in accordance with a phase difference of each given frequency between a first frequency signal and a second frequency signal, the first frequency signal corresponding to a first voice signal inputted to a first voice input section, the second frequency signal corresponding to a second voice signal inputted to a second voice input section, and performing, for a plurality of frames, a process of calculating a first phase difference deviation degree, the first phase difference deviation degree indicating the degree by which the phase difference of each given frequency is deviated from the utterance direction region;

executing a second calculation process that includes calculating a second phase difference deviation degree from the first phase difference deviation degree of the plurality of frames, the second phase difference deviation degree being a statistical value of the plurality of frames; and executing an utterance direction determination process that includes, when the second phase difference deviation degree is equal to or smaller than a first threshold value, determining that a user is uttering a voice to the first voice input section and the second voice input section.

12. The non-transitory computer-readable storage medium according to claim 11, wherein the first calculation process is configured to acquire the first frequency signal by performing time frequency conversion on one frame of the first voice signal inputted to the first voice input section, and the second calculation process is configured to acquire the second frequency signal by performing time frequency conversion on one frame of the second voice signal that is inputted to the second voice input section and corresponds to the one frame of the first voice signal.

13. The non-transitory computer-readable storage medium according to claim 11, wherein the utterance direction determination process is configured to set the first threshold value in accordance with the difference between a first utterance direction phase difference and a second utterance direction phase difference, the first utterance direction phase difference arising when the user is positioned in front of the first and second voice input sections, the second utterance direction phase difference arising when the user is positioned away from the front of the first and second voice input sections.

14. The non-transitory computer-readable storage medium according to claim 11, wherein the first calculation process is configured to calculate the first phase difference deviation degree by using the phase difference between the first and second frequency signals corresponding to a frequency higher than a second threshold value.

15. The non-transitory computer-readable storage medium according to claim 11, wherein the first calculation process is configured to calculate the first phase difference deviation degree by using the phase difference between the first and second frequency signals when the amplitude of at least one of the first and second frequency signals is greater than a third threshold value.

* * * * *